United States Patent
Yamauchi

(10) Patent No.: US 11,289,703 B2
(45) Date of Patent: Mar. 29, 2022

(54) POSITIVE ELECTRODE ACTIVE MATERIAL FOR SODIUM-ION SECONDARY CELL

(71) Applicant: NIPPON ELECTRIC GLASS CO., LTD., Otsu (JP)

(72) Inventor: Hideo Yamauchi, Otsu (JP)

(73) Assignee: NIPPON ELECTRIC GLASS CO., LTD., Shiga (JP)

( * ) Notice: Subject to any disclaimer, the term of this patent is extended or adjusted under 35 U.S.C. 154(b) by 303 days.

(21) Appl. No.: 15/742,540

(22) PCT Filed: Oct. 20, 2016

(86) PCT No.: PCT/JP2016/081131
§ 371 (c)(1),
(2) Date: Jan. 8, 2018

(87) PCT Pub. No.: WO2017/073457
PCT Pub. Date: May 4, 2017

(65) Prior Publication Data
US 2018/0183044 A1    Jun. 28, 2018

(30) Foreign Application Priority Data
Oct. 28, 2015    (JP) .............................. JP2015-211740

(51) Int. Cl.
| | |
|---|---|
| H01M 4/58 | (2010.01) |
| H01M 10/054 | (2010.01) |
| C01B 25/45 | (2006.01) |
| H01M 4/62 | (2006.01) |
| C03C 3/16 | (2006.01) |
| H01M 4/136 | (2010.01) |
| C03C 10/00 | (2006.01) |
| H01M 10/0562 | (2010.01) |
| C03B 32/02 | (2006.01) |
| H01M 4/02 | (2006.01) |

(52) U.S. Cl.
CPC ........... *H01M 4/5825* (2013.01); *C01B 25/45* (2013.01); *C03C 3/16* (2013.01); *C03C 10/00* (2013.01); *C03C 10/0054* (2013.01); *H01M 4/136* (2013.01); *H01M 4/62* (2013.01); *H01M 4/624* (2013.01); *H01M 10/054* (2013.01); *H01M 10/0562* (2013.01); *C03B 32/02* (2013.01); *H01M 2004/028* (2013.01); *H01M 2300/0068* (2013.01); *H01M 2300/0071* (2013.01)

(58) Field of Classification Search
CPC .... H01M 4/136; H01M 4/5825; H01M 4/624; H01M 4/62; H01M 10/0562; H01M 2004/028; H01M 2300/0071; H01M 2300/0068; C03C 3/16; C03C 10/0054; C03C 10/00; C03B 32/02

See application file for complete search history.

(56) References Cited

U.S. PATENT DOCUMENTS

| | | | |
|---|---|---|---|
| 10,374,229 B2 * | 8/2019 | Honma | ................. H01M 4/364 |
| 2004/0206938 A1 | 10/2004 | Barker et al. | |
| 2006/0091363 A1 | 5/2006 | Barker et al. | |
| 2010/0183923 A1 | 7/2010 | Okada et al. | |
| 2014/0197358 A1 | 7/2014 | Nose | |
| 2015/0303470 A1 | 10/2015 | Honma et al. | |
| 2017/0005337 A1 * | 1/2017 | Ikejiri | .................... H01M 4/364 |
| 2017/0217774 A1 | 8/2017 | Ikejiri et al. | |
| 2017/0346094 A1 | 11/2017 | Yamauchi | |

FOREIGN PATENT DOCUMENTS

| | | |
|---|---|---|
| CN | 101657919 A | 2/2010 |
| CN | 104247103 A | 12/2014 |
| CN | 106537667 A | 3/2017 |
| CN | 106575766 A | 4/2017 |
| CN | 107251283 A | 10/2017 |
| JP | 05-205741 A | 8/1993 |
| JP | 2006-523930 A | 10/2006 |
| JP | 2014-207157 A | 10/2014 |
| JP | 2015-026483 A | 2/2015 |
| WO | 2013/031331 A1 | 3/2013 |
| WO | 2013/133369 A1 | 9/2013 |
| WO | WO 2015/087734 | * 6/2015 |

OTHER PUBLICATIONS

Kim et al. "Na2FeP2O7 as a Promising Iron-Based Pyrophosphate Cathode for Sodium Rechargeable Batteries: A Combined Experimental and Theoretical Study", Advanced Functional Materials, 23 (9), 2013. pp. 1147-1155.*
Official Communication issued in International Patent Application No. PCT/JP2016/081131, dated Dec. 6, 2016.
Honma et al., "Fabrication of Na2FeP2O7 glass-ceramics for sodium ion battery", Journal of the Ceramic Society of Japan 120 [8], 2012, pp. 344-346.
Official Communication issued in corresponding Chinese Patent Application No. 201680062731.6, dated Jul. 3, 2020.

* cited by examiner

*Primary Examiner* — Laura Weiner
(74) *Attorney, Agent, or Firm* — Keating and Bennett, LLP

(57) ABSTRACT

Provided is a novel positive electrode active material for a sodium-ion secondary cell having a good discharge capacity. A positive electrode active material for a sodium-ion secondary cell, the positive electrode active material containing, in terms of % by mole of oxide, 8 to 55% $Na_2O$, 10 to 70% NiO, 0 to 60% CrO+FeO+MnO+CoO, and 15 to 70% $P_2O_5+SiO_2+B_2O_3$ and containing an amorphous phase.

10 Claims, 8 Drawing Sheets

[FIG. 1]
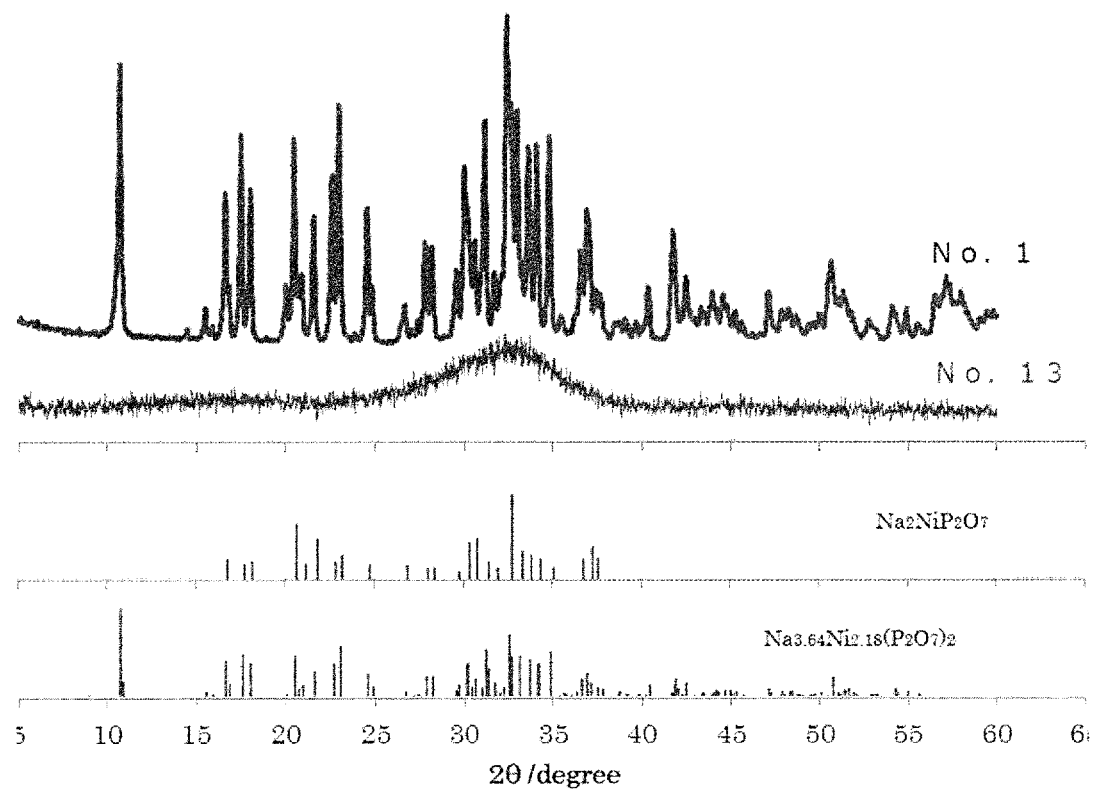
[FIG. 2]
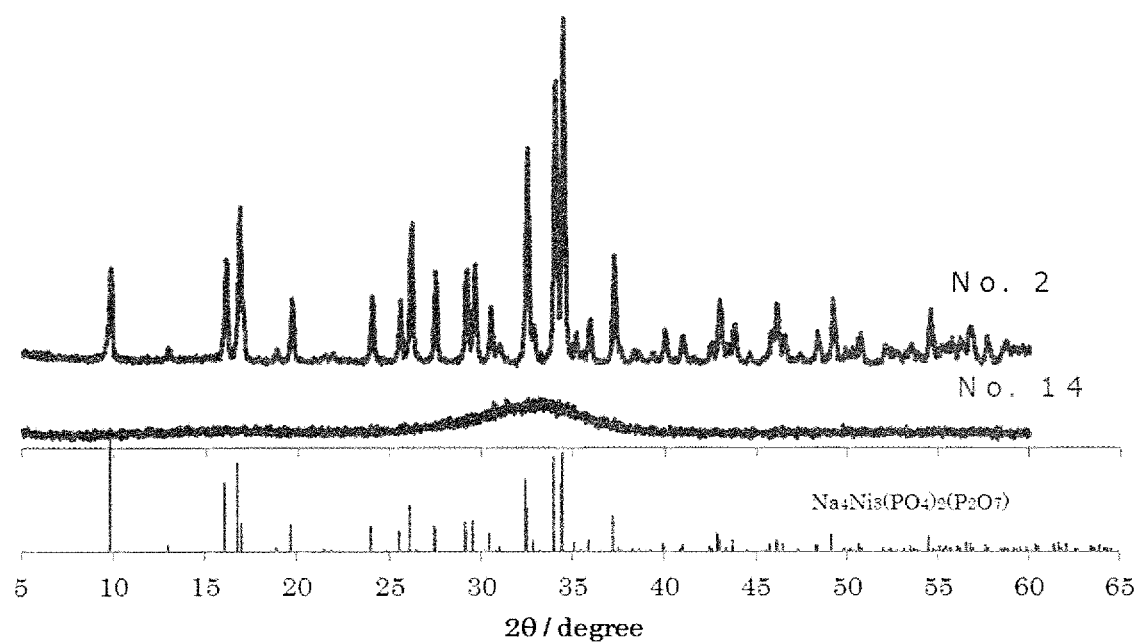

[FIG. 3]
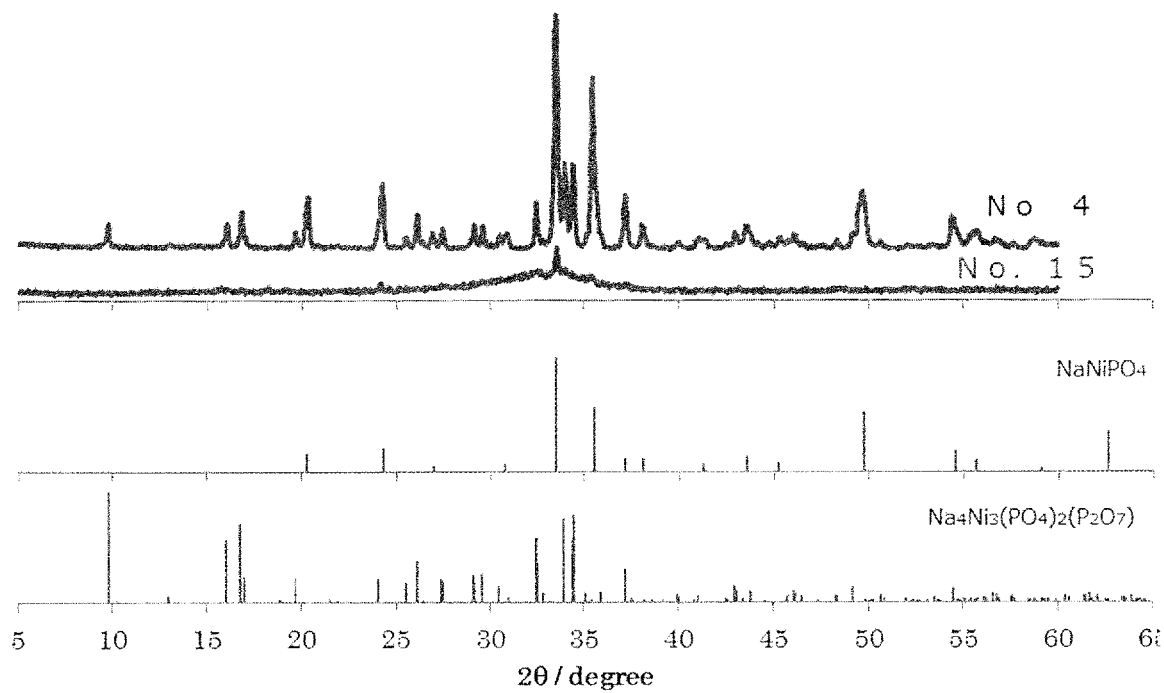
[FIG. 4]
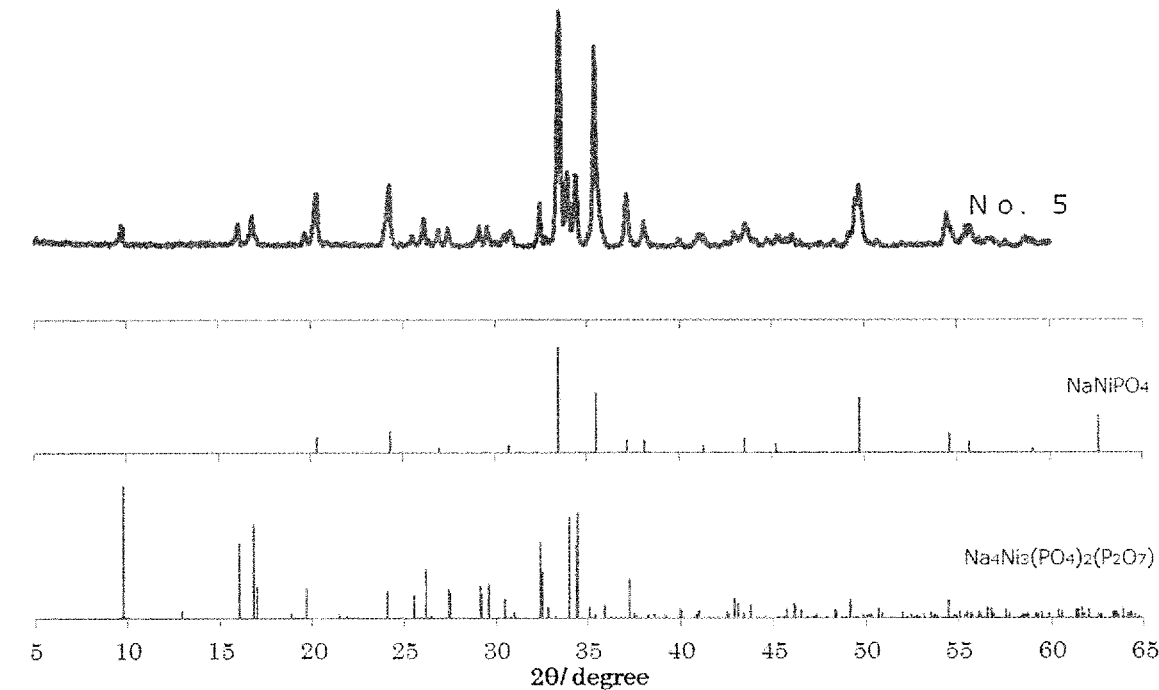

[FIG. 5]
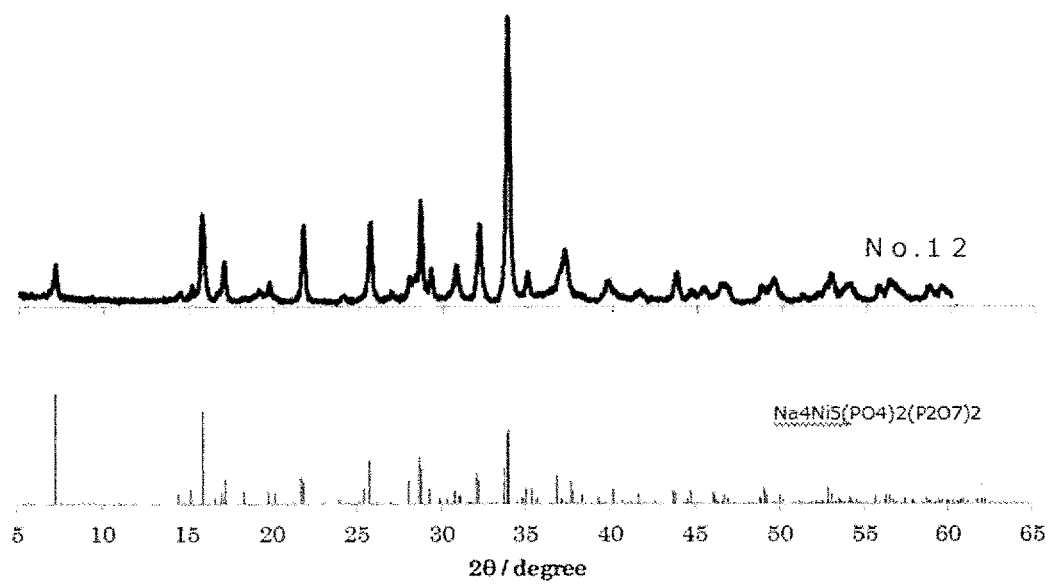
[FIG. 6]
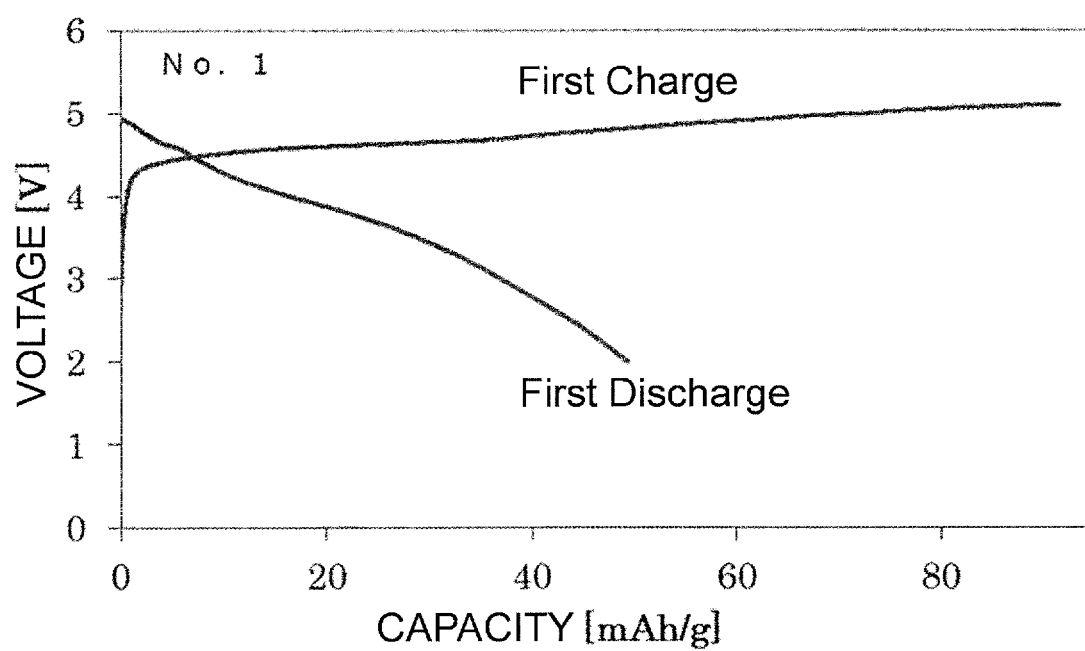

[FIG. 7]
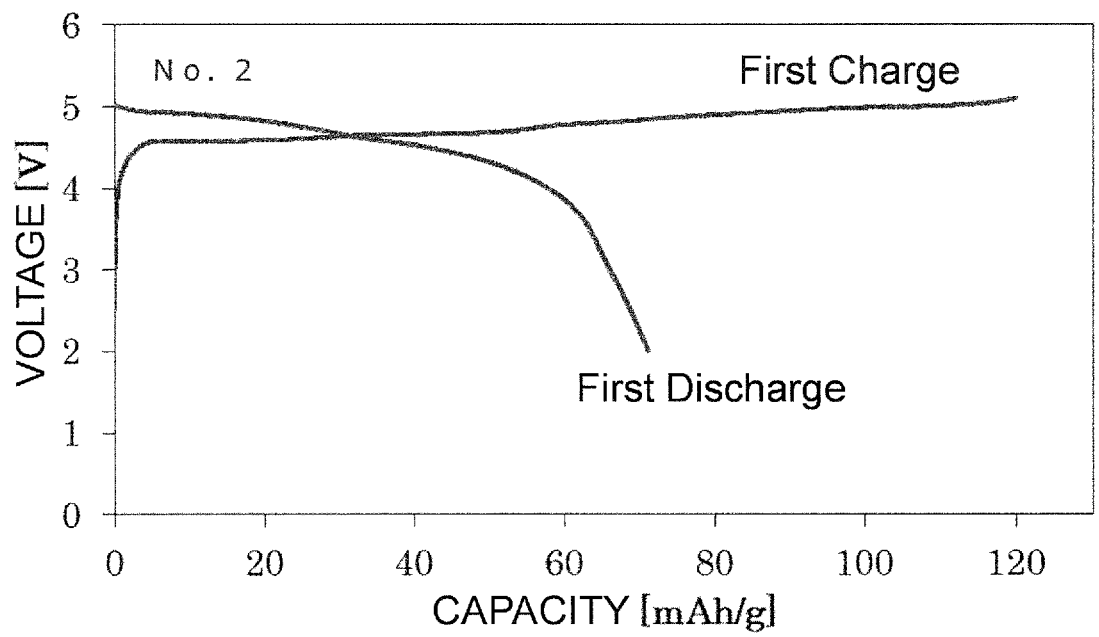
[FIG. 8]
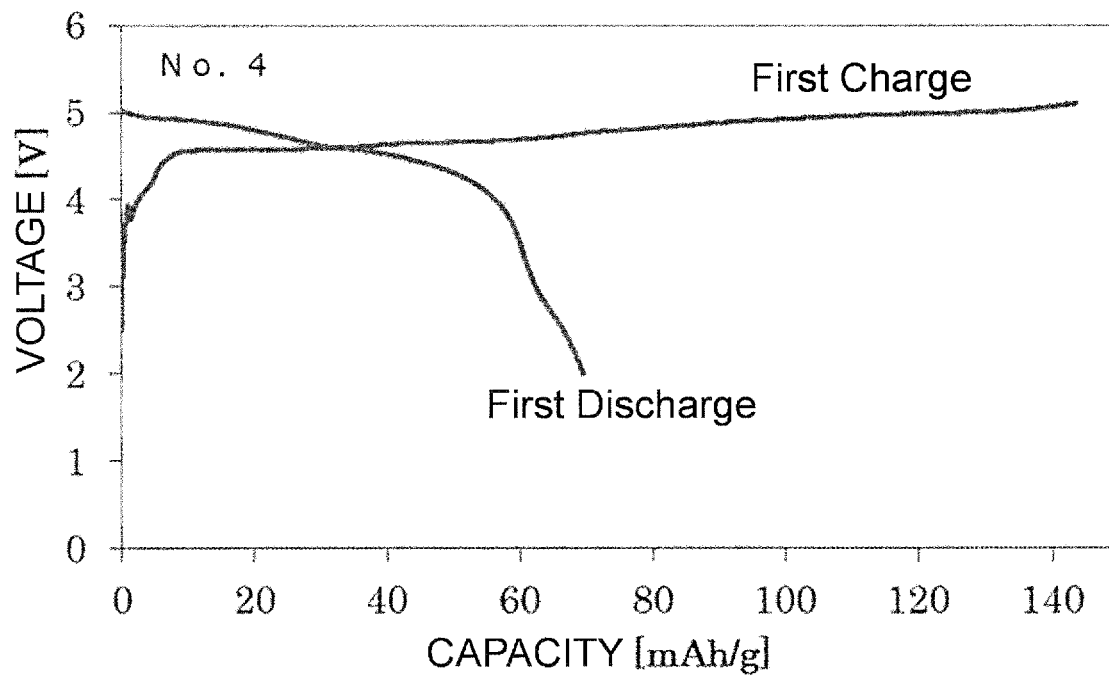

[FIG. 9]
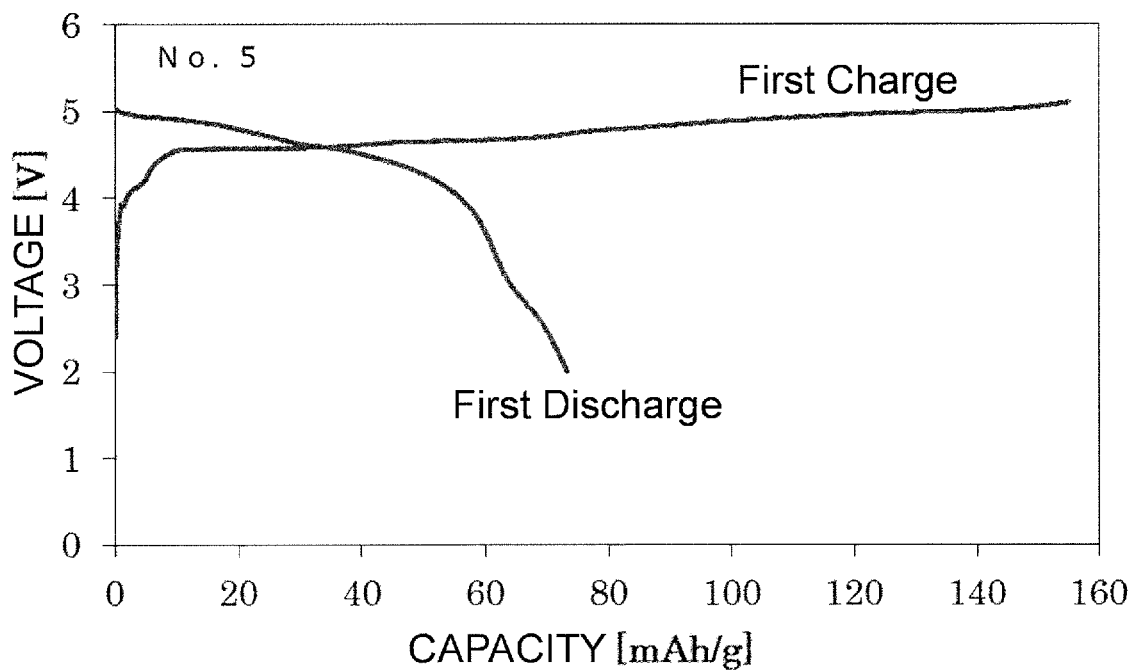
[FIG. 10]
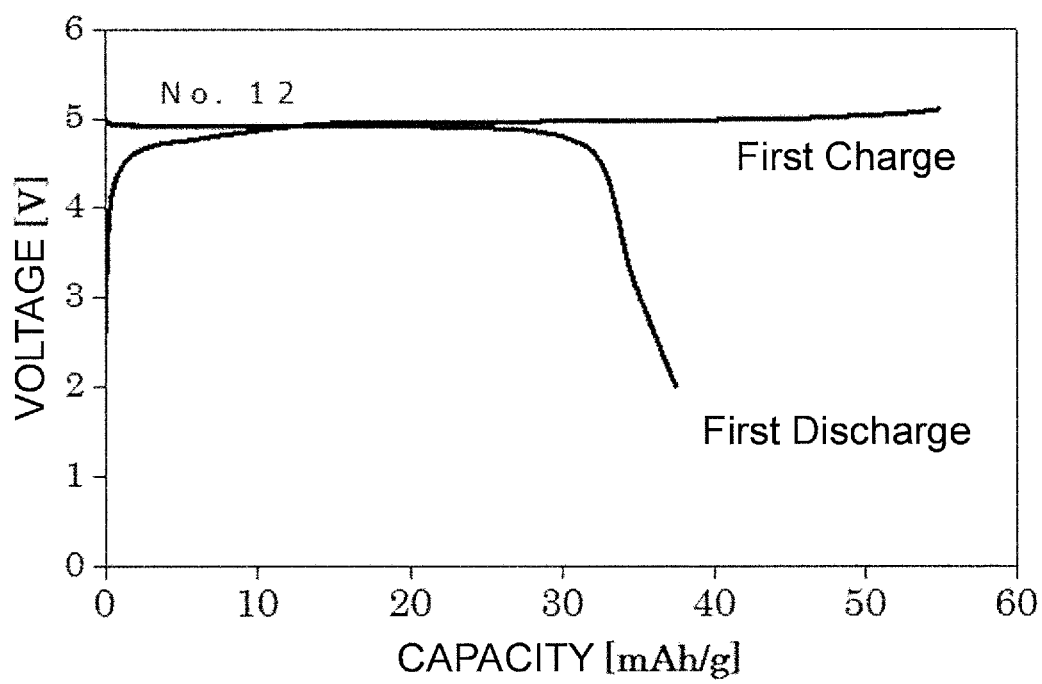

[FIG. 11]
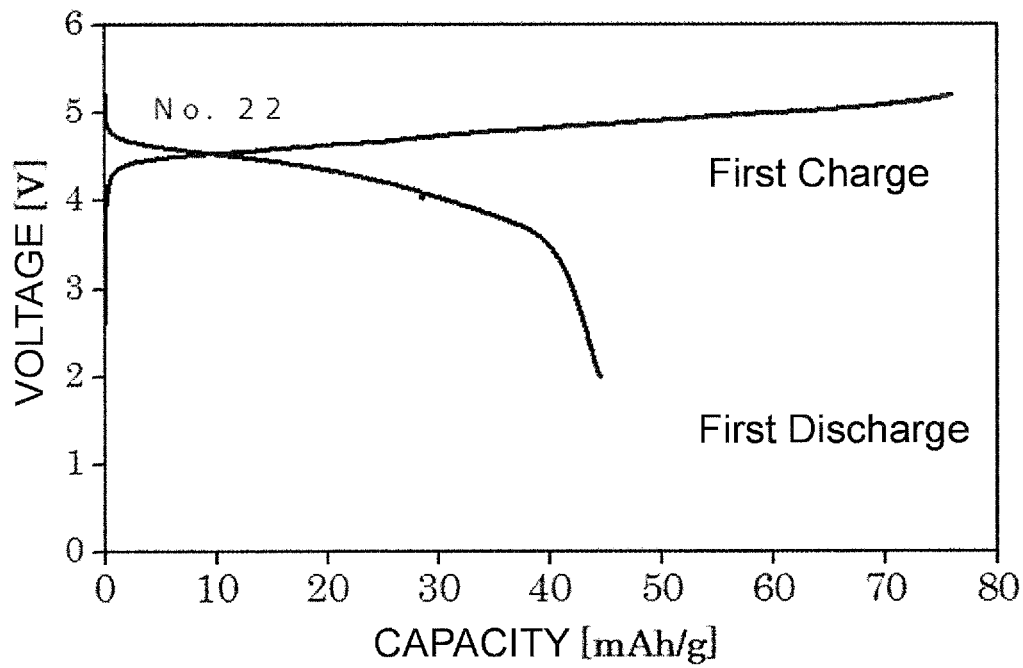
[FIG. 12]
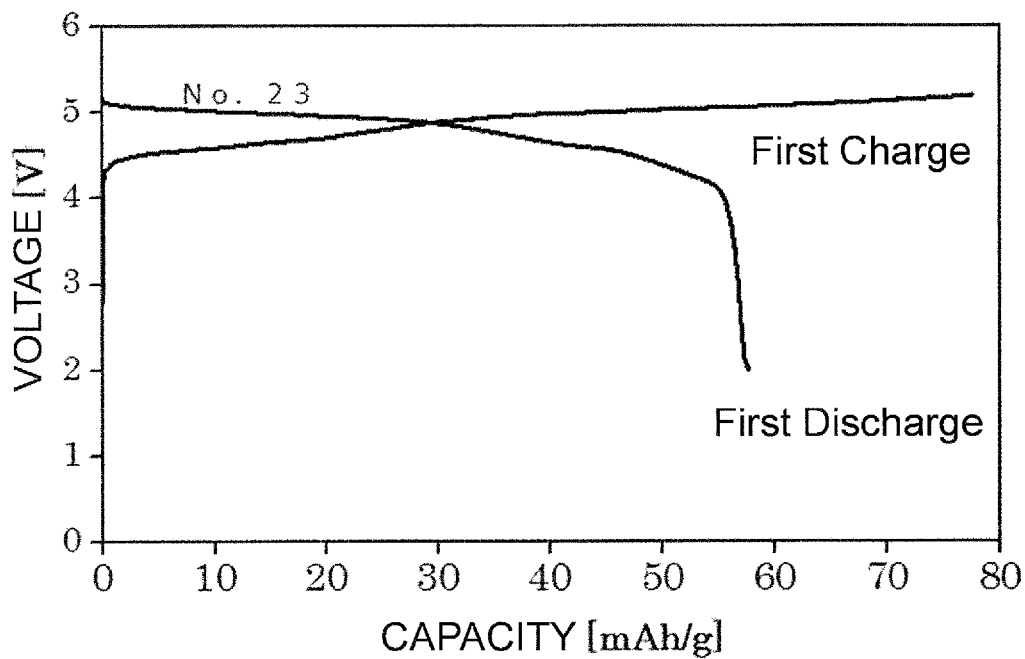

[FIG. 13]
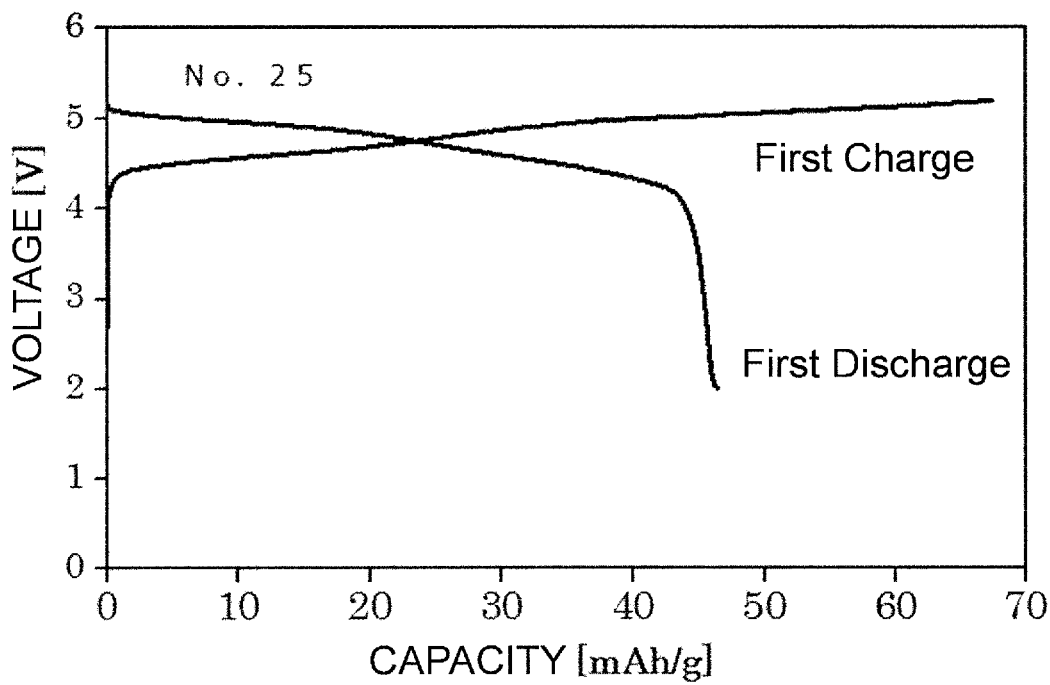
[FIG. 14]
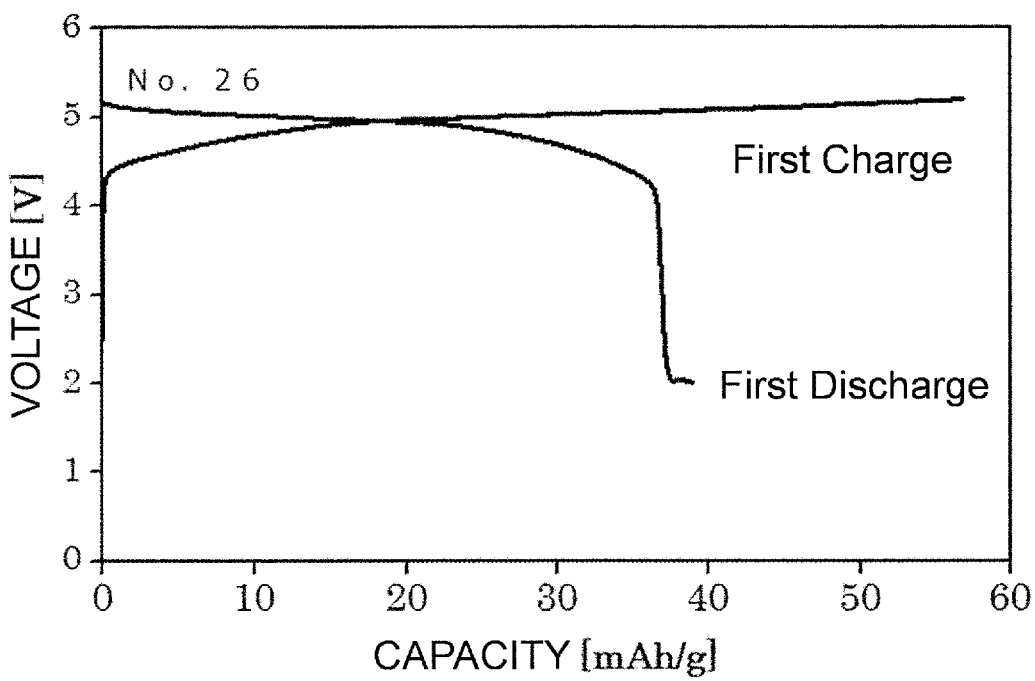

[FIG. 15]
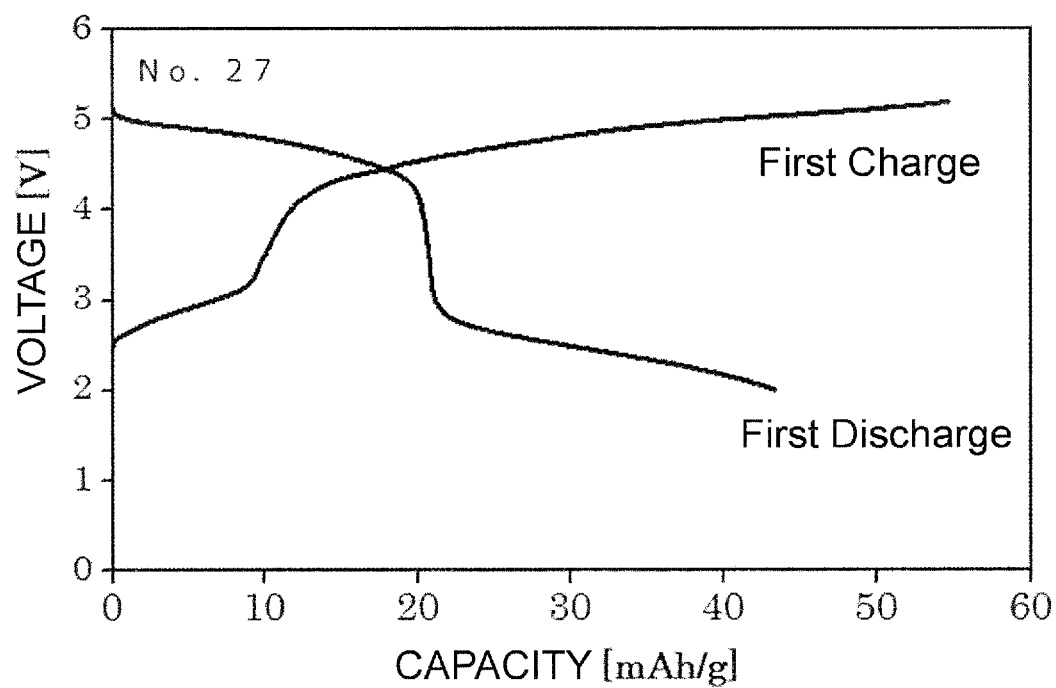

POSITIVE ELECTRODE ACTIVE MATERIAL FOR SODIUM-ION SECONDARY CELL

TECHNICAL FIELD

The present invention relates to positive electrode active materials for sodium ion cells used in portable electronic devices, electric vehicles, and so on.

BACKGROUND ART

Lithium-ion secondary cells have secured their place as high-capacity and light-weight power sources essential for mobile electronic terminals, electric vehicles, and so on and attention has been focused, as their positive electrode active material, on active materials containing an olivine crystal represented by the general formula $LiFePO_4$ (see, for example, Patent Literature 1). However, as for lithium, there are concerns about such issues as a global price increase of its raw materials and, therefore, studies have recently been conducted on sodium-ion secondary cells in which sodium is used as an alternative to lithium (see, for example, Non-Patent Literature 1).

CITATION LIST

Patent Literature

Patent Literature 1: JP-A H05-205741

Non-Patent Literature

Non-Patent Literature 1: Journal of the Ceramic Society of Japan 120 [8] 344-346 2012

SUMMARY OF INVENTION

Technical Problem

Conventional positive electrode active materials for sodium-ion secondary cells, containing a crystal represented by $Na_2FeP_2O_7$, have a problem of low discharge capacity.

In view of the above, the present invention has an object of providing a novel positive electrode active material for a sodium-ion secondary cell having a good discharge capacity.

Solution to Problem

The inventor has found from intensive studies that the above problem can be solved by a positive electrode active material of a particular composition containing a Ni component and proposes the positive electrode active material as the present invention.

Specifically, a positive electrode active material for a sodium-ion secondary cell according to the present invention contains, in terms of % by mole of oxide, 8 to 55% $Na_2O$, 10 to 70% NiO, 0 to 60% CrO+FeO+MnO+CoO, and 15 to 70% $P_2O_5+SiC_2+B_2O_3$ and contains an amorphous phase. Note that "(component)+(component)+ . . . " herein means the total content of the components.

NiO changes the valence of Ni ions during charge and discharge to cause a redox reaction and thus act as a drive force for insertion and extraction of sodium ions. Therefore, since the positive electrode active material contains a predetermined amount of NiO as an essential component as described above, the discharge capacity can be increased.

Also, since the positive electrode active material for a sodium-ion secondary cell according to the present invention has a feature of containing an amorphous phase, the diffusion path for sodium ions thus three-dimensionally expands, which facilitates insertion and extraction of sodium ions during charge and discharge and enables the capacity to be increased. Furthermore, rapid charge/discharge characteristics and cycle characteristics are likely to increase. Moreover, when the positive electrode active material is used as a positive electrode active material for a solid-state sodium-ion secondary cell, the amorphous phase softens and flows during firing to fusion bond the positive electrode active material and a sodium-ion conductive solid electrolyte together, so that a dense sintered body is likely to be formed. Therefore, an ion-conducting path is likely to be formed at the interface between the positive electrode active material and the sodium-ion conductive solid electrolyte. The incorporation of amorphous in the positive electrode active material also offers an advantage that the decomposition of electrolyte by the positive electrode active material is likely to be inhibited.

The positive electrode active material for a sodium-ion secondary cell according to the present invention may contain a crystal represented by a general formula $Na_x(Ni_{1-a}M_a)A_yO_z$ (where M represents at least one selected from the group consisting of Fe, Cr, Mn, and Co, A represents at least one selected from the group consisting of P, Si, and B, $0.2 \le x \le 4.2$, $0.65 \le y \le 6.5$, $2.5 \le z \le 20$, and $0 \le a \le 0.9$). By doing so, the redox potential during charge and discharge is likely to be held constant at a high potential, so that the energy density is likely to increase.

In the positive electrode active material for a sodium-ion secondary cell according to the present invention, the crystal preferably has at least one crystal structure selected from monoclinic, triclinic, and orthorhombic crystal structures.

A positive electrode material for a sodium-ion secondary cell according to the present invention preferably contains the above-described positive electrode active material for a sodium-ion secondary cell.

The positive electrode material for a sodium-ion secondary cell according to the present invention preferably further contains a conductive aid.

The positive electrode material for a sodium-ion secondary cell according to the present invention may further contain a sodium-ion conductive solid electrolyte.

In the positive electrode material for a sodium-ion secondary cell according to the present invention, the sodium-ion conductive solid electrolyte is preferably beta-alumina or a NASICON crystal.

The positive electrode material for a sodium-ion secondary cell according to the present invention preferably contains, in % by mass, 30 to 100% the positive electrode active material for a sodium-ion secondary cell, 0 to 20% the conductive aid, and 0 to 70 the sodium-ion conductive solid electrolyte.

In a positive electrode for a sodium-ion secondary cell according to the present invention, the above-described positive electrode material for a sodium-ion secondary cell is used.

A sodium-ion secondary cell according to the present invention includes the above-described positive electrode for a sodium-ion secondary cell.

A method for producing a positive electrode active material fora sodium-ion secondary cell according to the present invention is a method for producing the above-described positive electrode active material for a sodium-ion secondary cell and includes the steps of: melting a raw material batch to obtain a melt; and forming the melt into a shape to obtain a glass body.

The method for producing the positive electrode active material for a sodium-ion secondary cell according to the present invention may further include the step of firing the glass body to be crystallized.

Advantageous Effects of Invention

The present invention enables provision of a novel positive electrode active material for a sodium-ion secondary cell having a good discharge capacity.

BRIEF DESCRIPTION OF DRAWINGS

FIG. 1 is a chart showing XRD (X-ray diffraction) patterns of samples Nos. 1 and 13 which are working examples.

FIG. 2 is a chart showing XRD patterns of samples Nos. 2 and 14 which are working examples.

FIG. 3 is a chart showing XRD patterns of samples Nos. 4 and 15 which are working examples.

FIG. 4 is a chart showing an XRD pattern of sample No. 5 which is a working example.

FIG. 5 is a chart showing an XRD pattern of sample No. 12 which is a working example.

FIG. 6 is a graph showing first charge/discharge curves of a test cell for a sodium-ion secondary cell in which sample No. 1 as a working example is used.

FIG. 7 is a graph showing first charge/discharge curves of a test cell for a sodium-ion secondary cell in which sample No. 2 as a working example is used.

FIG. 8 is a graph showing first charge/discharge curves of a test cell for a sodium-ion secondary cell in which sample No. 4 as a working example is used.

FIG. 9 is a graph showing first charge/discharge curves of a test cell for a sodium-ion secondary cell in which sample No. 5 as a working example is used.

FIG. 10 is a graph showing first charge/discharge curves of a test cell for a sodium-ion secondary cell in which sample No. 12 as a working example is used.

FIG. 11 is a graph showing first charge/discharge curves of a test cell for a sodium-ion secondary cell in which sample No. 22 as a working example is used.

FIG. 12 is a graph showing first charge/discharge curves of a test cell for a sodium-ion secondary cell in which sample No. 23 as a working example is used.

FIG. 13 is a graph showing first charge/discharge curves of a test cell for a sodium-ion secondary cell in which sample No. 25 as a working example is used.

FIG. 14 is a graph showing first charge/discharge curves of a test cell for a sodium-ion secondary cell in which sample No. 26 as a working example is used.

FIG. 15 is a graph showing first charge/discharge curves of a test cell for a sodium-ion secondary cell in which sample No. 27 as a working example is used.

DESCRIPTION OF EMBODIMENTS (Positive Electrode Active Material for Sodium-Ion Secondary Cell)

A positive electrode active material for a sodium-ion secondary cell according to the present invention has a feature of containing, in terms of % by mole of oxide, 8 to 55% $Na_2O$, 10 to 70% NiO, 0 to 60% CrO+FeO+MnO+CoO, and 15 to 70% $P_2O_5+SiO_2+B_2O_3$ and containing an amorphous phase. Reasons why each of the components is limited as just described will be described below. Note that in the following description of the content of each component "%" refers to "% by mole" unless otherwise stated.

$Na_2O$ serves, during charge and discharge, as a supply source of sodium ions that move between the positive electrode active material and a negative electrode active material. The content of $Na_2O$ is 8 to 55%, preferably 15 to 45%, and particularly preferably 25 to 35%. If $Na_2O$ is too less, the amount of sodium ions contributing to insertion and extraction becomes small, so that the discharge capacity tends to decrease. On the other hand, if $Na_2O$ is too much, other crystals not contributing to charge and discharge, such as $Na_3PO_4$, are likely to precipitate, so that the discharge capacity tends to decrease.

NiO changes the valence of Ni ions during charge and discharge to cause a redox reaction and thus act as a drive force for insertion and extraction of sodium ions. The content of NiO is 10 to 70%, preferably 15 to 60%, more preferably 20 to 55%, still more preferably 23 to 50%, yet still more preferably 25 to 40%, and particularly preferably 26 to 36%. If NiO is too less, a redox reaction during charge and discharge becomes less likely to occur, so that the amount of sodium ions to be inserted and extracted becomes small and, therefore, the discharge capacity tends to decrease. On the other hand, if NiO is too much, other crystals tend to precipitate to decrease the discharge capacity.

CrO, FeO, MnO, and CoO, like NiO, change the valences of these transition metal element ions during charge and discharge to cause redox reactions and thus act as drive forces for insertion and extraction of sodium ions. MnO is preferred because it exhibits a particularly high redox potential. Furthermore, FeO is preferred because it has high structural stability during charge and discharge to make the cycle characteristics likely to increase. The content of CrO+FeO+MnO+CoO is 0 to 60%, preferably 0.1 to 50%, more preferably 0.5 to 45%, still more preferably 1 to 40%, yet still more preferably 3 to 30%, and particularly preferably 5 to 20%. If CrO+FeO+MnO+CoO is too much, other crystals not contributing to charge and discharge, such as FeO, MnO, and NiO, are likely to precipitate, so that the discharge capacity tends to decrease. Note that when priority is given to increasing the redox potential, it is preferred that the content of CrO+FeO+MnO+CoO be made as small as possible and the content of NiO be made larger.

Also note that the transition metal elements in CrO, FeO, MnO, and CoO are preferably low-valent ions, particularly divalent ions, in the glass. In this case, the redox potential generated during charge and discharge is likely to be high and the discharge capacity and discharge voltage are also likely to be high.

$P_2O_5$, $SiO_2$, and $B_2O_3$ form a three-dimensional network and, therefore, have the effect of stabilizing the structure of the positive electrode active material. Furthermore, when the positive electrode active material contains these components, it can increase the content of the amorphous phase. $P_2O_5$ and $SiO_2$ are particularly preferred because they have excellent ion conductivity, and $P_2O_5$ is most preferred. The content of $P_2O_5+SiO_2+B_2O_3$ is 15 to 70%, preferably 20 to 60%, and particularly preferably 25 to 45%. If $P_2O_5+SiO_2+B_2O_3$ is too less, the discharge capacity after repeated charge and discharge tends to be likely to decrease. On the other hand, if $P_2O_5+SiO_2+B_2O_3$ is too much, other crystals not contributing to charge and discharge, such as $P_2O_5$, tend to precipitate. Note that the content of each component of $P_2O_5$, $SiO_2$, and $B_2O_3$ is preferably 0 to 70%, more preferably 15 to 70%, still more preferably 20 to 60%, yet still more preferably 25 to 45%, and particularly preferably 29 to 35%.

$Na_2O/NiO$ is preferably 0.2 to 5, more preferably 0.3 to 4, and particularly preferably 0.4 to 3. If $Na_2O/NiO$ is too small or too large, the discharge capacity tends to decrease. Furthermore, $NiO/(P_2O_5+SiO_2+B_2O_3)$ is preferably 0.2 to 4, more preferably 0.3 to 3, and particularly preferably 0.4 to 2. If $NiO/(P_2O_5+SiO_2+B_2O_3)$ is too small or too large, the discharge capacity tends to decrease. Here, "$Na_2O/NiO$" means the molar ratio between the contents of $Na_2O$ and $NiO$. Furthermore, "$NiO/(P_2O_5+SiO_2+B_2O_3)$" means the molar ratio between the content of NiO and the content of $P_2O_5+SiO_2+B_2O_3$.

In addition to the above components, various components can be contained in the positive electrode active material without impairing the effects of the present invention, which facilitates vitrification. Examples of these components include, in terms of oxides, MgO, CaO, SrO, BaO, ZnO, CuO, $Al_2O_3$, $GeO_2$, $Nb_2O_5$, $ZrO_2$, $V_2O_5$, and $Sb_2O_5$. $Al_2O_3$ acting as a network forming oxide and $V_2O_5$ serving as an active material component are particularly preferred. The content of the above components is, in total, preferably 0 to 30%, more preferably 0.1 to 20%, and particularly preferably 0.5 to 10%.

The positive electrode active material for a sodium-ion secondary cell according to the present invention has a feature of containing an amorphous phase. Thus, as described previously, the positive electrode active material can enjoy effects of obtaining higher capacity, enhancing rapid charge/discharge characteristics and cycle characteristics, and so on.

The positive electrode active material for a sodium-ion secondary cell according to the present invention may contain a crystal represented by a general formula $Na_x(Ni_{1-a}M_a)A_yO_z$ (where M represents at least one selected from the group consisting of Fe, Cr, Mn, and Co, A represents at least one selected from the group consisting of P, Si, and B, $0.2 \le x \le 4.2$, $0.65 \le y \le 6.5$, $2.5 \le z \le 20$, and $0 \le a \le 0.9$). By doing so, the redox potential during charge and discharge is likely to be held constant at a high potential, so that the energy density is likely to increase.

The value x is preferably in a range of $0.2 \le x \le 4.2$, more preferably $0.5 \le x \le 3.5$, still more preferably $0.6 \le x \le 2.5$, and particularly preferably $1.35 \le x \le 2.1$. If the value x is too small, the amount of sodium ions contributing to insertion and extraction becomes small, so that the discharge capacity tends to decrease. On the other hand, if the value x is too large, other crystals not contributing to charge and discharge, such as $Na_3PO_4$, are likely to precipitate, so that the discharge capacity tends to decrease.

The value y is preferably in a range of $0.65 \le y \le 6.5$, more preferably $0.95 \le y \le 4$, and particularly preferably $1.2 \le y \le 3$. If the value y is too small, the amount of transition metal element for a redox reaction becomes small, so that the amount of sodium ions contributing to insertion and extraction becomes small and, therefore, the discharge capacity tends to decrease. On the other hand, if the value y is too large, other crystals not contributing to charge and discharge, such as FeO, MnO, and NiO, are likely to precipitate, so that the discharge capacity tends to decrease.

The value z is preferably in a range of $2.5 \le z \le 20$, more preferably $3.5 \le z \le 15$, and particularly preferably $4 \le z \le 10$. If the value z is too small, the valence of the transition metal element becomes smaller than two, so that it is likely to precipitate as a metal during charge and discharge. The precipitated metal elutes into an electrolytic solution and precipitate in the form of a metal dendrite on the negative electrode side, which may cause an internal short-circuit. In addition, if the value z is too small, sodium ions become less extracted or a redox reaction of the transition metal becomes less likely to occur, so that the discharge capacity tends to decrease. On the other hand, if the value z is too large, the valence of the transition metal element becomes more than two and its redox reaction during charge and discharge becomes less likely to occur, so that the amount of sodium ions to be inserted and extracted becomes small and, therefore, the discharge capacity is likely to decrease.

M representing a transition metal element may be at least one selected from the group consisting of Cr, Fe, Mn, and Co. Mn is preferred because Mn exhibits a particularly high redox potential. Furthermore, Fe is preferred because Fe has high structural stability during charge and discharge to make the cycle characteristics likely to increase.

A has a role as an element for forming a skeleton of a crystal structure as a network forming component and may be at least one selected from the group consisting of P, Si, and B. P and Si are preferred because they have excellent structural stability, and P is particularly preferred because it has excellent ion conductivity.

The value a is preferably $0 \le a \le 0.9$, more preferably $0 \le a \le 0.5$, still more preferably $0 \le a \le 0.3$, and particularly preferably $a=0$. As the value a is smaller, the redox potential becomes higher, so that when the positive electrode active material is used for a power storage device, it is likely to exhibit a high charge/discharge voltage.

The crystal represented by the general formula $Na_x(Ni_{1-a}M_a)A_yO_z$ (wherein its operating voltage is 4 to 6 V (vs. $Na/Na^+$) preferably has at least one crystal structure of monoclinic, triclinic, and orthorhombic crystal structures. Specific examples of the crystal include $Na_4Ni(PO_3)_6$ (=$Na_4NiP_6O_{18}$, theoretical capacity: 42.9 mAh/g, triclinic), $Na_3NiP_3O_{10}$ (theoretical capacity: 70.4 mAh/g), $Na_2Ni(Si_4O_{10})$ (=$Na_2NiSi_4O_{10}$, theoretical capacity: 71.1 mAh/g, triclinic), $Na_4Ni(PO_4)_2$ (=$Na_4NiP_2O_8$, theoretical capacity: 78.7 mAh/g), $NaNi(PO_3)_3$ (=$NaNiP_3O_9$, theoretical capacity: 84.1 mAh/g, monoclinic), $Na_2Ni_2B_{12}O_{21}$ (=$NaNiB_6O_{10.5}$, theoretical capacity: 85.2 mAh/g, monoclinic), $Na_3Ni_2P_5O_{16}$ (=$Na_{1.5}NiP_{2.5}O_8$, theoretical capacity: 89.8 mAh/g), $Na_2NiP_2O_7$ (theoretical capacity: 96.2 mAh/g), $Na_{3.64}Ni_{2.18}(P_2O_7)_2$ (=$Na_{1.67}NiP_{1.83}O_{6.42}$, theoretical capacity: 104.4 mAh/g, triclinic), $Na_6Ni_4P_6O_{22}$ (=$Na_{1.5}NiP_{1.5}O_{5.5}$, theoretical capacity: 117.7 mAh/g), $Na_4Ni_3P_4O_{15}$ (=$Na_{1.33}NiP_{1.33}O_5$, theoretical capacity: 127.2 mAh/g, orthorhombic), $Na_4Ni_5(PO_4)_2(P_2O_7)_2$ (=$Na_{0.8}NiP_{1.2}O_{4.4}$, theoretical capacity: 116.1 mAh/g, monoclinic), $NaNiPO_4$ (theoretical capacity: 151.7 mAh/g, orthorhombic), $Na_6Ni_9(PO_4)_8$ (=$Na_{0.67}NiP_{0.89}O_{3.56}$, theoretical capacity: 112.8 mAh/g), $Na_4Ni_7(PO_4)_6$ (=$Na_{0.57}NiP_{0.86}O_{3.43}$, theoretical capacity: 99.9 mAh/g, monoclinic), and $NaNi_4(PO_4)_3$ (=$Na_{0.25}NiP_{0.75}O_3$, theoretical capacity: 49.4 mAh/g, orthorhombic). Note that the expressions of the above crystals are rational formulas and the formulas described in parentheses represent general formulas where the factor of Ni in each rational formula is normalized to 1. When the general formula has the same expression as the rational formula, its description is omitted.

As the crystallite size of the crystal is smaller, the average particle size of the positive electrode active material particles can be made smaller, so that the electrical conductivity can be more increased. Specifically, the crystallite size is preferably 100 nm or less and particularly preferably 80 nm or less. The lower limit of the crystallite size is not particularly limited but is, actually, preferably not less than 1 nm and more preferably not less than 10 nm. The crystallite size can be determined from analysis results of powder X-ray diffraction of the crystal according to the Scherrer equation.

The contents of the amorphous phase and the crystal in the positive electrode active material are preferably appropriately selected depending on desired properties. For example, the content of the amorphous phase in the positive electrode active material is, in % by mass, preferably 0.1% or more, more preferably 1% or more, still more preferably 5% or more, yet still more preferably 10% or more, yet still more preferably 20% or more, yet still more preferably 30% or more, yet still more preferably 50% or more, yet still more preferably 70% or more, and particularly preferably 90% or more (i.e., the content of the crystal is, in % by mass, preferably 99.9% or less, more preferably 99% or less, still more preferably 95% or less, yet still more preferably 90% or less, yet still more preferably 80% or less, yet still more preferably 70% or less, yet still more preferably 50% or less, yet still more preferably 30% or less, and particularly preferably 10% or less). If the content of the amorphous phase is too small, the previously described effects are less likely to be achieved. Note that when the proportion of amorphous in the positive electrode active material increases, the flexibility of composition design becomes high as compared to a positive electrode active material composed of a crystal, so that an advantage is provided that a voltage increase and a capacity increase are likely to be achieved by appropriately adjusting the composition (for example, increasing the content of transition metal component). The upper limit of the content of the amorphous phase is not particularly limited and may be 100% (i.e., the content of crystal may be 0%). However, in positively precipitating the crystal, the upper limit of the content of the amorphous phase may be preferably not more than 99.9%, more preferably not more than 99%, still more preferably not more than 95%, yet still more preferably not more than 90%, yet still more preferably not more than 80%, yet still more preferably not more than 70%, yet still more preferably not more than 50%, yet still more preferably not more than 30%, and particularly preferably not more than 10% (i.e., the content of the crystal may be, in % by mass, preferably not less than 0.1%, more preferably not less than 1%, still more preferably not less than 5%, yet still more preferably not less than 10%, yet still more preferably not less than 20%, yet still more preferably not less than 30%, yet still more preferably not less than 50%, yet still more preferably not less than 70%, and particularly preferably not less than 90%. By doing so, the previously described effect to be achieved by including the crystal can be simultaneously enjoyed.

The contents of the amorphous phase and the crystal in the positive electrode active material can be determined by using a diffraction line profile at $2\theta$ values of 10 to 60° obtained by powder X-ray diffraction measurement using CuKα rays and making a peak separation from the profile into crystalline diffraction lines and an amorphous halo. Specifically, the background is subtracted from the diffraction line profile to obtain a total scattering curve, a broad diffraction curve (amorphous halo) at 10 to 45° is peak-separated from the total scattering curve and integrated, the obtained integrated intensity of the halo is represented as $Ia$, crystalline diffraction lines of a crystalline phase detected at 10 to 60° and represented by the previously described general formula are peak-separated from the total scattering curve and integrated, the sum of the obtained integrated intensities of the crystalline diffraction lines is represented as $Ic$, and the sum of integrated intensities determined from the crystalline diffraction lines derived from the other crystals is represented as $Io$. In this case, the content $Xg$ of the amorphous phase and the content $Xc$ of the crystal can be determined from the following equations.

$$Xg=[Ia/(Ic+Ia+Io)]\times100(\% \text{ by mass})$$

$$Xc=[Ic/(Ic+Ia+Io)]\times100(\% \text{ by mass})$$

The positive electrode active material for a power storage device according to the present invention may be coated or formed into a composite with electrically conductive carbon. By doing so, the electronic conductivity becomes high and, thus, the rapid charge/discharge characteristics are likely to increase. Examples of the electrically conductive carbon that can be used include highly electrically conductive carbon blacks, such as acetylene black and Ketjenblack, and graphite or other carbon powder and carbon fibers. Preferred among them is acetylene black because of its high electronic conductivity.

An example of a method for coating the positive electrode active material with an electrically conductive carbon is a method of mixing the positive electrode active material with an organic compound which is a source of the electrically conductive carbon and then firing the mixture in an inert or reducing atmosphere to carbonize the organic compound. Any material may be used as the organic compound so far as it can stay as carbon in the process of heat treatment, but glucose, citric acid, ascorbic acid, phenolic resin, a surfactant or the like is preferably used, and a surfactant is particularly preferred because it is easily adsorbable on the surface of the positive electrode active material. The surfactant may be any of a cationic surfactant, an anionic surfactant, an amphoteric surfactant, and a non-ionic surfactant, but particularly preferred is a non-ionic surfactant because of its excellent adsorbability on the surface of the positive electrode active material.

The mixing ratio between the positive electrode active material and the electrically conductive carbon is, in mass ratio, preferably 80-99.5:0.5-20 and more preferably 85-98:2-15. If the content of the electrically conductive carbon is too small, the electronic conductivity tends to be poor. On the other hand, if the content of the electrically conductive carbon is too large, the content of the positive electrode active material becomes relatively small, so that the discharge capacity tends to decrease.

Note that when the surface of the positive electrode active material is coated with an electrically conductive carbon, the thickness of the electrically conductive carbon coating is preferably 1 to 100 nm and particularly preferably 5 to 80 nm. If the thickness of the electrically conductive carbon coating is too small, the electrically conductive carbon coating is likely to be lost in the process of charging/discharging to deteriorate the cell characteristics. On the other hand, if the thickness of the electrically conductive carbon coating is too large, a decrease in discharge capacity, a voltage drop, and so on are likely to occur.

In the positive electrode active material fora sodium-ion secondary cell according to the present invention, the ratio (D/G) of a peak intensity D between 1300 and 1400 $cm^{-1}$ to a peak intensity G between 1550 and 1650 $cm^{-1}$, both measured by Raman spectroscopy, is preferably 1 or less and particularly preferably 0.8 or less, and the ratio (F/G) of a peak intensity F between 800 to 1100 $cm^{-1}$ to the peak intensity G is preferably 0.5 or less and particularly preferably 0.1 or less. When these peak intensity ratios satisfy the above ranges, the electronic conductivity of the positive electrode active material tends to be high.

No particular limitation is placed on the form of the positive electrode active material for a power storage device, but a powdered form is preferred because the number of sites for insertion and extraction of sodium ions is increased. In this case, its average particle size is preferably 0.1 to 20 µm, more preferably 0.3 to 15 µm, still more preferably 0.5 to 10 µm, and particularly preferably 0.6 to 5 µm. Furthermore, its maximum particle size is preferably 150 µm or less, more preferably 100 µm or less, still more preferably 75 µm or less, and particularly preferably 55 µm or less. If the average particle size or maximum particle size is too large, the number of sites for insertion and extraction of sodium ions during charge and discharge becomes small, so that the discharge capacity tends to decrease. On the other hand, if the average particle size is too small, the dispersed state of powder in the positive electrode active material when produced in paste form tends to be poor, which makes it difficult to produce a uniform electrode.

Here, the average particle size and the maximum particle size refer to a median primary particle diameter D50 (diameter at 50% cumulative volume) and a median primary particle diameter D99 (diameter at 99% cumulative volume), respectively, and are values measured by a laser diffraction particle size distribution measurement device.

(Method for Producing Positive Electrode Active Material for Sodium-Ion Secondary Cell)

The positive electrode active material for a sodium-ion secondary cell according to the present invention can be produced by a melt-quenching process as described below. First, powders of raw materials are formulated to give a desired composition, thus obtaining a raw material batch. Next, the obtained raw material batch is melted. The melting temperature need only be appropriately adjusted so that the raw material batch becomes homogeneous. Specifically, the melting temperature is preferably 800° C. or more, more preferably 900° C. or more, and particularly preferably 1000° C. or more. The upper limit of the melting temperature is not particularly limited. However, because an excessively high melting temperature causes evaporation of the sodium component or energy loss, its upper limit is preferably not more than 1500° C. and particularly preferably not more than 1400° C.

Meanwhile, in the case where the positive electrode active material contains an Fe component, the extraction of sodium ions during a first charge results in progress of an oxidation reaction of $Fe^{2+} \rightarrow Fe^{3+}$ as charge compensation. Therefore, if the proportion of divalent ions in the positive electrode active material is increased, the above oxidation reaction for charge compensation becomes likely to occur to easily increase the first charge/discharge efficiency. However, glass containing divalent Fe ions (FeO) is likely to change the oxidation state of Fe atoms depending on the melting conditions: melting in an air atmosphere is likely to cause oxidation of the divalent Fe ions into trivalent Fe ions ($Fe_2O_3$). To cope with this, the melting is conducted in a reducing atmosphere or an inert atmosphere. Thus, the increase in valence of Fe ions in glass can be inhibited, so that a power storage device having an excellent first charge/discharge efficiency can be obtained.

For the melting in a reducing atmosphere, it is preferred to supply a reducing gas into a melting bath. In using $H_2$ gas as the reducing gas, it is preferred, for reduction in the risks of explosion and the like during melting, to use a mixed gas in which an inert gas, such as $N_2$, is added to $H_2$ gas. Specifically, the mixed gas preferably contains, in % by volume, 90 to 99.5% $N_2$ and 0.5 to 10% $H_2$ and more preferably contains, in % by volume, 92 to 99% $N_2$ and 1 to 8% $H_2$. For the melting in an inert atmosphere, it is preferred to supply an inert gas into a melting bath. The preferred inert gas to be used is nitrogen, argon or helium. The reducing gas or the inert gas may be supplied into an atmosphere located above the molten glass in the melting bath or may be supplied directly into the molten glass through a bubbling nozzle or both of these approaches may be concurrently used.

In the case where the positive electrode active material contains P, the use of a phosphate, such as sodium metaphosphate ($NaPO_3$) or sodium tertiary phosphate ($Na_3PO_4$), as powder of starting material makes it easy to obtain a positive electrode active material low in devitrified foreign matter and excellent in homogeneity. With the use of this positive electrode active material as a positive electrode material, a secondary cell having a stable discharge capacity is likely to be obtained.

Resultant melt is cooled and formed into a shape, thus obtaining a glass body. No particular limitation is placed on the method for forming the melt into a shape and, for example, the melt may be formed into a film with rapid cooling by pouring the melt between a pair of cooling rolls or formed into an ingot by casting the melt into a mold. The glass body is preferably an amorphous body from the viewpoint of homogeneity, but may partly contain a crystalline phase.

Note that when the glass body contains trivalent Fe ions, the trivalent Fe ions are preferably reduced to divalent Fe ions, for example, by firing in a reducing atmosphere. Examples of the reducing atmosphere include atmospheres containing at least one reducing gas selected from $H_2$, $NH_3$, CO, $H_2S$, and $SiH_4$. From the viewpoint of efficiently reducing Fe ions in the glass body from trivalent ions to divalent ions, $H_2$, $NH_3$ or CO is preferred and $H_2$ is particularly preferred. In using $H_2$, it is preferred, for reduction in the risks of explosion and the like during firing, to use a mixed gas of $N_2$ and $H_2$. The mixed gas preferably contains, in % by volume, 90 to 99.9% $N_2$ and 0.1 to 10% $H_2$, more preferably contains, in % by volume, 90 to 99.5% $N_2$ and 0.5 to 10% $H_2$, and still more preferably contains, in % by volume, 92 to 99% $N_2$ and 1 to 4% $H_2$.

The firing temperature (maximum temperature) is preferably equal to or higher than the glass transition point of the glass body, specifically, preferably 350 to 900° C., more preferably 400 to 850° C., still more preferably 425 to 800° C., and particularly preferably 450 to 750° C. If the firing temperature is too low, the reduction of Fe ions tends to be insufficient. On the other hand, if the firing temperature is too high, the glass body particles are fusion bonded together to decrease the specific surface area, so that the discharge capacity of the positive electrode active material tends to decrease.

The maximum temperature holding time during firing is preferably 10 to 600 minutes and particularly preferably 30 to 120 minutes. If the holding time is too short, the amount of heat energy given is small, so that the reduction of Fe ions tends to be insufficient. On the other hand, if the holding time is too long, the glass body particles are fusion bonded together to decrease the specific surface area, so that the discharge capacity of the positive electrode active material tends to decrease.

The glass body obtained in the above manner may be fired and thereby crystallized. Thus, a positive electrode active material having both of an amorphous phase and a crystalline phase can be obtained.

The firing temperature for crystallization is preferably equal to or higher than the glass transition temperature and more preferably equal to or higher than the crystallization temperature. The glass transition temperature and the crystallization temperature can be determined from DSC (differential scanning calorimetry) or DTA (differential thermal analysis). If the firing temperature is too low, the precipitation of the crystalline phase tends to be insufficient. On the other hand, if the firing temperature is too high, the glass body particles are fusion bonded together to decrease the specific surface area, so that the discharge capacity of the positive electrode active material tends to decrease. Therefore, the firing temperature is preferably 900° C. or less, more preferably 850° C. or less, still more preferably 800° C. or less, and particularly preferably 750° C. or less.

The firing time is appropriately adjusted so that the crystallization of the glass body sufficiently progresses. Specifically, the firing time is preferably 20 to 300 minutes and more preferably 30 to 240 minutes.

For the above firing, an electric heating furnace, a rotary kiln, a microwave heating furnace, a high-frequency heating furnace, or other furnaces can be used. Note that the Fe ion reduction and crystallization of the glass body may be concurrently performed.

Furthermore, if necessary, the positive electrode active material may be given an electrical conductivity by mixing the glass body and an electrically conductive carbon while grinding them. An example of a method for mixing them with grinding is a method in which a general grinder is used, such as a mortar, a mortar mixer, a ball mill, an attritor, a vibrating ball mill, a satellite ball mill, a planetary ball mill, a jet mill or a bead mill. Preferred among them is the use of a planetary ball mill. The planetary ball mill has a structure in which a disk rotates while pots thereon rotate, so that very high impact energy can be efficiently produced. Thus, the electrically conductive carbon can be dispersed homogeneously into the glass body to increase the electronic conductivity.

Moreover, as described previously, the glass body may be coated with an electrically conductive carbon by mixing the glass body with an organic compound which is a source of the electrically conductive carbon and then firing the mixture in an inert or reducing atmosphere to carbonize the organic compound. This firing may be conducted concurrently with a heat treatment process for reducing Fe ions or a heat treatment process for crystallizing the glass body.

When a positive electrode active material is produced by a general solid reaction process, the charge/discharge potential may be undesirably excessively increased. Therefore, when the positive electrode active material is applied to a sodium-ion secondary cell in which a nonaqueous electrolytic solution is used as an electrolyte, the charge/discharge potential may reach the decomposition potential of the electrolytic solution. As a result, with repeated charge and discharge cycles, decreases in discharge capacity and charge/discharge efficiency resulting from the decomposition of the electrolytic solution are more likely to occur. Furthermore, the positive electrode active material obtained by the solid reaction process generally contains no amorphous and is, therefore, less likely to enjoy the previously described effects of the present invention that would be obtained if it contained amorphous.

(Positive Electrode Material for Sodium-Ion Secondary Cell)

A positive electrode material for a sodium-ion secondary cell is obtained by mixing the positive electrode active material for a sodium-ion secondary cell according to the present invention with a conductive aid, a binder, and so on.

Examples of the conductive aid include highly electrically conductive carbon blacks, such as acetylene black and Ketjenblack, and powdered or fibrous electrically conductive graphite or other carbons. Preferred among them is acetylene black because it can increase the electrical conductivity even when added in small amount.

The binder is a component to be added to a positive electrode material in order to bind together materials forming the positive electrode material and prevent the positive electrode active material from shedding from the positive electrode due to a volume change during charge and discharge. Specific examples of the binder include thermoplastic straight-chain polymers, such as polytetrafluoroethylene (PTFE), poly(vinylidene fluoride) (PVDF), fluorine-containing rubbers, and styrene-butadiene rubber (SBR); thermosetting resins, such as thermosetting polyimide, polyamide-imide, polyamide, phenolic resin, epoxy resin, urea resin, melamine resin, unsaturated polyester resin, and polyurethane; cellulose derivatives, such as carboxymethyl cellulose (including salts of carboxymethyl cellulose, such as sodium carboxymethyl cellulose, the same applies hereafter), hydroxypropylmethyl cellulose, hydroxypropyl cellulose, hydroxyethyl cellulose, ethyl cellulose, and hydroxymethyl cellulose; and water-soluble polymers, such as polyvinyl alcohol, polyacrylamide, polyvinyl pyrrolidone, and their copolymers. Among them, thermosetting resins, cellulose derivatives, and water-soluble polymers are preferred because of their excellent binding properties and thermosetting polyimide or carboxymethyl cellulose is more preferred because of their industrially widespread use. Particularly, carboxymethyl cellulose is most preferred because it is inexpensive and has such low environmental burden that it does not need any organic solvent for preparation of a paste for electrode formation. These binders may be used singly or in a mixture of two or more of them.

In using the positive electrode active material for a sodium-ion secondary cell according to the present invention as a solid-state sodium-ion secondary cell, a sodium-ion conductive solid electrolyte is preferably added as a component of the positive electrode material for a sodium-ion secondary cell. The sodium-ion conductive solid electrolyte is a component that plays a role in conducting sodium ions between a positive electrode and a negative electrode in an all-solid-state power storage device. The sodium-ion conductive solid electrolyte is preferably beta-alumina or a NASICON crystal because they have excellent sodium-ion conductivity. Beta-alumina includes two types of crystals: β alumina (theoretical composition formula: $Na_2O \cdot 11Al_2O_3$) and β" alumina (theoretical composition formula: $Na_2O \cdot 5.3Al_2O_3$). Because β" alumina is a metastable material, it is generally used by adding $Li_2O$ or $MgO$ as a stabilizing agent thereto. Because β" alumina has a higher sodium-ion conductivity than β alumina, β" alumina alone or a mixture of β" alumina and β alumina is preferably used and $Li_2O$-stabilized β" alumina ($Na_{1.6}Li_{0.34}Al_{10.66}O_{17}$) or $MgO$-stabilized β" alumina (($Al_{10.32}Mg_{0.68}O_{16}$) ($Na_{1.68}$)) is more preferably used.

Preferred examples of the NASICON crystal include $Na_3Zr_2Si_2PO_{12}$, $Na_{3.2}Zr_{1.3}Si_{2.2}P_{0.8}O_{10.5}$, $Na_3Zr_{1.6}Ti_{0.4}Si_2PO_{12}$, $Na_3Hf_2Si_2PO_{12}$, $Na_{3.4}Zr_{0.9}Hf_{1.4}Al_{0.6}Si_{1.2}P_{1.8}O_{12}$, $Na_3Zr_{1.7}Nb_{0.24}Si_2PO_{12}$, $Na_{3.6}Ti_{0.2}Y_{0.8}Si_{2.8}O_9$, $Na_3Zr_{1.88}Y_{0.12}Si_2PO_{12}$, $Na_{3.12}Zr_{1.88}Y_{0.12}Si_2PO_{12}$, and $Na_{3.6}Zr_{0.13}Yb_{1.67}Si_{0.11}P_{2.9}O_{12}$ and the particularly preferred is $Na_{3.12}Zr_{1.88}Y_{0.12}Si_2PO_{12}$ because it has excellent sodium-ion conductivity.

The average particle size D50 of the sodium-ion conductive solid electrolyte is preferably 0.3 to 25 μm, more preferably 0.5 to 20 μm, and particularly preferably 1.2 to 15 μm. If the average particle size D50 of the sodium-ion conductive solid electrolyte is too small, not only the sodium-ion conductive solid electrolyte becomes difficult to uniformly mix with the positive electrode active material, but also becomes likely to decrease the ion conductivity because it absorbs moisture or becomes carbonated. As a result, the internal resistance tends to increase to decrease the charge/discharge voltage and discharge capacity. On the other hand, if the average particle size D50 of the sodium-ion conductive solid electrolyte is too large, this significantly inhibits the softening and flow of the positive electrode active material during firing for the formation of a positive electrode layer, so that the resultant positive electrode layer tends to have poor smoothness to decrease the mechanical strength or tends to increase the internal resistance.

The composition of the positive electrode material is preferably appropriately selected depending on the type of electrolyte used. For example, in a sodium-ion secondary cell in which an aqueous or nonaqueous liquid electrolyte is used, the positive electrode material preferably contains, in % by mass, 70 to 95% positive electrode active material, 1 to 15% conductive aid, and 3 to 15% binder and more preferably contains, in % by mass, 80 to 95% positive electrode active material, 2 to 10% conductive aid, and 3 to 10% binder. If the content of positive electrode active material is too small, the discharge capacity of the sodium-ion secondary cell is likely to decrease. If the content of positive electrode active material is too large, the contents of conductive aid and binder become relatively small, so that the electronic conductivity and cycle characteristics are likely to decrease. If the content of conductive aid is too small, the electronic conductivity tends to be poor. If the content of conductive aid is too large, the bindability between components of the positive electrode material decreases to increase the internal resistance, so that the charge/discharge voltage and discharge capacity tend to decrease. If the content of binder is too small, the bindability between the components of the positive electrode material decreases, so that the cycle characteristics are likely to decrease. If the content of binder is too large, the electronic conductivity decreases and, therefore, the rapid charge/discharge characteristics are likely to decrease.

In the case of a solid-state sodium-ion secondary cell in which a sodium-ion conductive solid electrolyte is used as the electrolyte, the positive electrode material preferably contains, in % by mass, 30 to 100% positive electrode active material, 0 to 20% conductive aid, and 0 to 70% solid electrolyte, more preferably contains, in % by mass, 34.5 to 94.5% positive electrode active material, 0.5 to 15% conductive aid, and 5 to 65% solid electrolyte, and still more preferably contains, in % by mass, 40 to 92% positive electrode active material, 1 to 10% conductive aid, and 7 to 50% solid electrolyte. If the content of positive electrode active material is too small, the discharge capacity of the sodium-ion secondary cell is likely to decrease. If the content of conductive aid or solid electrolyte is too large, the bindability between components of the positive electrode material decreases to increase the internal resistance, so that the charge/discharge voltage and discharge capacity tend to decrease.

The mixing of the components of the positive electrode material can be made using a mixer, such as a planetary centrifugal mixer or a tumbler mixer, or a general grinder, such as a mortar, a mortar mixer, a ball mill, an attritor, a vibrating ball mill, a satellite ball mill, a planetary ball mill, a jet mill or a bead mill. Particularly, the use of a planetary ball mill enables homogeneous dispersion of the components.

The positive electrode material for a sodium-ion secondary cell according to the present invention is used as a positive electrode for a sodium-ion secondary cell by applying the positive electrode material onto a current collector formed of a metal foil, such as aluminum, copper or gold, and drying it. Alternatively, it is possible to form the positive electrode material for a sodium-ion secondary cell according to the present invention into a sheet and then form a current collector formed of a metal coating by sputtering, plating or other processes.

(Sodium-Ion Secondary Cell)

A sodium-ion secondary cell according to the present invention includes, in addition to the above positive electrode for a sodium-ion secondary cell, a negative electrode as a counter electrode and an electrolyte.

The negative electrode contains a negative electrode active material capable of inserting and extracting sodium ions during charge and discharge. Examples of the negative electrode active material that can be used include metallic materials, such as metallic Na, metallic Sn, metallic Bi, metallic Zn, Sn—Cu alloy, and Bi—Cu alloy, carbon materials, such as hard carbon, and oxide materials containing Ti and/or Nb as an element. Preferred among them are oxide materials containing Ti and/or Nb as an element because they have high safety and are rich as resources. Particularly preferably used are oxide materials containing a crystalline phase represented by $Na_4TiO(PO_4)_2$ or $Na_5Ti(PO_4)_3$ that has a redox potential of 1.5 V or less (vs. $Na/Na^+$) during charge and discharge. In this case, the operating voltage of the sodium-ion secondary cell becomes high, so that dendrites of metallic Na can be inhibited from precipitating during repeated charge and discharge.

Examples of the electrolyte that can be used include an aqueous electrolyte, a nonaqueous electrolyte, and a solid electrolyte. Nonaqueous electrolytes or solid electrolytes have wide potential windows and, therefore, produce little gas due to electrolyte decomposition during charge and discharge, so that the safety of the sodium-ion secondary cell can be increased. Preferred between them are solid electrolytes because of their non-flammability.

Aqueous electrolytes contain a water-soluble electrolyte salt. Examples of the electrolyte salt include $NaNO_3$, $Na_2SO_4$, NaOH, NaCl, and $CH_3COONa$. These electrolyte salts may be used singly or in a mixture of two or more of them. The electrolyte salt concentration is appropriately adjusted, generally, within a range of 0.1M to the saturation concentration.

Note that in using an aqueous electrolyte, the redox potential of the positive electrode active material for a sodium-ion secondary cell according to the present invention can be used only within the potential window of water.

Nonaqueous electrolytes contain: an organic solvent and/or an ionic liquid both of which are nonaqueous solvents; and an electrolyte salt dissolved in the nonaqueous solvent. No particular limitation is placed on the type of the organic solvent as the nonaqueous solvent, but examples include propylene carbonate (PC), ethylene carbonate (EC), 1,2-dimethoxyethane (DME]) γ-butyrolactone (GBL), tetrahydrofuran (THF), 2-methyltetrahydrofuran (2-MeHF), 1,3-dioxolan, sulfolane, acetonitrile (AN), diethyl carbonate (DEC), dimethyl carbonate (DMC), methylethyl carbonate (MEC), and dipropyl carbonate (DPC). These nonaqueous solvents may be used singly or in a mixture of two or more of them. Preferred among them is propylene carbonate because of its excellent low-temperature characteristics.

No particular limitation is also placed on the type of the ionic liquid so long as it can dissolve an electrolyte salt used, and specific examples include: aliphatic quaternary ammonium salts, such as N,N,N-trimethyl-N-propyl ammonium bis(trifluoromethanesulfonyl)imide [abbr. TMPA-TFSI], N-methyl-N-propylpiperidinium bis(trifluoromethanesulfonyl)imide [abbr. PP13-TFSI], N-methyl-N-propylpyrrolidinium bis(trifluoromethanesulfonyl)imide [abbr. P13-TFSI], and N-methyl-N-butylpyrrolidinium bis(trifluoromethanesulfonyl)imide [abbr. P14-TFSI]; and quaternary alkylimidazolium salts, such as 1-methyl-3-ethylimidazolium tetrafluoroborate [abbr. EMIBF4], 1-methyl-3-ethylimidazolium bis(trifluoromethanesulfonyl)imide [abbr. EMITFSI], 1-allyl-3-ethylimidazolium bromide [abbr. AEImBr], 1-allyl-3-ethylimidazolium tetrafluoroborate [abbr. AEImBF4], 1-allyl-3-ethylimidazoliumbis(trifluoromethanesulfonyl)imide [abbr. AEImTFSI], 1,3-diallylimidazolium bromide [abbr. AAImBr], 1,3-diallylimidazolium tetrafluoroborate [abbr. AAImBF4], and 1,3-diallylimidazolium bis(trifluoromethanesulfonyl)imide [abbr. AAImTFSI].

Examples of the electrolyte salt include sodium salts of $PF_6^-$, $BF_4^-$, $(CF_3SO_2)_2N^-$ (bis(trifluoromethanesulfonyl)amide, commonly called TFSI), $CF_3SO_3^-$ (commonly called TFS), $(C_2F_5SO_2)_2N^-$ (bis(pentafluoroethanesulfonyl)amide, commonly called BETI), $ClO_4^-$, $AsF_6^-$, $SbF_6^-$, bis(oxalato)boric acid $(B(C_2O_4)_2^-$, commonly called BOB), difluoro(trifluoro-2-oxide-2-trifluoro-methyl propipnate(2-)-0,0)boric acid $(BF_2OCOOC(CF_3)_3^-$, commonly called B(HHIB)), and so on. These electrolyte salts may be used singly or in a mixture of two or more of them. Particularly preferred are sodium salts of $PF_6^-$ and $BF_4^-$, which are inexpensive. The electrolyte salt concentration is appropriately adjusted, generally, within a range of 0.5M to 3M.

The nonaqueous electrolyte may contain an additive, such as vinylene carbonate (VC), vinylene acetate (VA), vinylene butyrate, vinylene hexanoate, vinylene crotonate or catechol carbonate. These additives serve to form a protective film on the surface of the active material. The concentration of additive is, per 100 parts by mass of nonaqueous electrolyte, preferably 0.1 to 3 parts by mass and particularly preferably 0.5 to 1 part by mass.

Solid electrolytes that can be used are as described previously. Solid electrolytes have wide potential windows as compared to aqueous and nonaqueous electrolytes and, therefore, produce little gas due to decomposition, so that the safety of the sodium-ion secondary cell can be increased.

In a sodium-ion secondary cell based on an electrolytic solution in which an aqueous electrolyte or a nonaqueous electrolyte is used, a separator is preferably provided between the electrodes. The separator is made of a material having insulation properties and specific examples of the material that can be used include: porous film or non-woven fabric obtained from a polymer, such as polyolefin, cellulose, polyethylene terephthalate or vinylon; non-woven glass fabric containing fibrous glass; glass cloth in which fibrous glass is woven; and film-like glass.

EXAMPLES

Hereinafter, a description will be given in detail of the present invention with reference to its examples, but the present invention is not at all limited to the following examples.

Sodium-Ion Secondary Cell Using Nonaqueous Electrolyte

Tables 1 to 4 show Examples (Nos. 1 to 15) of the present invention and Comparative Examples (Nos. 16 to 18).

TABLE 1

| | | Example | | | |
|---|---|---|---|---|---|
| | | 1 | 2 | 3 | 4 |
| Composition (% by mole) | $Na_2O$ | 33.3 | 28.6 | 30.8 | 26.7 |
| | NiO | 33.3 | 42.8 | 38.4 | 46.6 |
| | $P_2O_5$ | 33.3 | 28.6 | 30.8 | 26.7 |
| | $Na_2O/NiO$ | 1.00 | 0.67 | 0.80 | 0.57 |
| | $NiO/P_2O_5$ | 1.00 | 1.50 | 1.25 | 1.75 |
| Crystal Content (% by mass) | | 95 | 99 | 87 | 92 |
| Amorphous Content (% by mass) | | 5 | 1 | 13 | 8 |
| Type of Precipitated Crystal * Characters in [ ] indicate a general formula where the factor of Ni is normalized to 1. | | $Na_2NiP_2O_7$ $Na_{3.64}Ni_{2.18}(P_2O_7)_2$ $[Na_{1.67}NiP_{1.83}O_{6.42}]$ | $Na_4Ni_3(PO_4)_2(P_2O_7)$ $[Na_{1.33}NiP_{1.33}O_5]$ | $Na_4Ni_3(PO_4)_2(P_2O_7)$ $[Na_{1.33}NiP_{1.33}O_5]$ $Na_{3.64}Ni_{2.18}(P_2O_7)_2$ $[Na_{1.67}NiP_{1.83}O_{6.42}]$ | $NaNiPO_4$ $Na_4Ni_3(PO_4)_2(P_2O_7)$ $[Na_{1.33}NiP_{1.33}O_5]$ |
| Cell Characteristic | Discharge Capacity (mAh/g) | 49 | 71 | 56 | 70 |
| | Discharge Capacity Retention (%) | 77 | 71 | 79 | 69 |

| | | Example | |
|---|---|---|---|
| | | 5 | 6 |
| Composition (% by mole) | $Na_2O$ | 25 | 31 |
| | NiO | 50 | 41.4 |
| | $P_2O_5$ | 25 | 27.6 |
| | $Na_2O/NiO$ | 0.50 | 0.75 |
| | $NiO/P_2O_5$ | 2.00 | 1.50 |
| Crystal Content (% by mass) | | 97.5 | 87 |
| Amorphous Content (% by mass) | | 2.5 | 13 |
| Type of Precipitated Crystal * Characters in [ ] indicate a general formula where the | | $NaNiPO_4$ $Na_4Ni_3(PO_4)_2(P_2O_7)$ | $Na_4Ni_3P_4O_{15}$ $[Na_{1.33}NiP_{1.33}O_5]$ $NaNi_4(PO_4)_3$ |

TABLE 1-continued

|  |  |  |  |
|---|---|---|---|
| factor of Ni is normalized to 1. |  | [$Na_{1.33}NiP_{1.33}O_5$] | [$Na_{0.25}NiP_{0.75}O_3$]<br>$Na_4Ni_3(PO_4)_2P_2O_7$<br>[$Na_{1.33}NiP_{1.33}O_5$] |
| Cell Characteristic | Discharge Capacity (mAh/g) | 73 | 58 |
|  | Discharge Capacity Retention (%) | 65 | 76 |

TABLE 2

|  |  | Example | | | |
|---|---|---|---|---|---|
|  |  | 7 | 8 | 9 | 10 |
| Composition (% by mole) | $Na_2O$ | 33 | 37.5 | 27.8 | 27.2 |
|  | NiO | 40 | 37.5 | 41.6 | 40.8 |
|  | $P_2O_5$ | 27 | 25 | 30.6 | 32 |
|  | $Na_2O/NiO$ | 0.83 | 1.00 | 0.67 | 0.67 |
|  | $NiO/P_2O_5$ | 1.48 | 1.50 | 1.36 | 1.28 |
| Crystal Content (% by mass) |  | 99.5 | 92 | 97 | 88 |
| Amorphous Content (% by mass) |  | 0.5 | 8 | 3 | 12 |
| Type of Precipitated Crystal<br>* Characters in [ ] indicate a general formula where the factor of Ni is normalized to 1. |  | $Na_4Ni_3P_4O_{15}$<br>[$Na_{1.33}NiP_{1.33}O_5$]<br>$Na_{3.64}Ni_{2.18}(P_2O_7)_2$<br>[$Na_{1.67}NiP_{1.83}O_{6.42}$] | $Na_4Ni_3P_4O_{15}$<br>[$Na_{1.33}Ni_3P_{1.33}O_5$]<br>$Na_4Ni(PO_4)_2$<br>[$Na_4NiP_2O_8$] | $Na_4Ni_3(PO_4)_2(P_2O_7)$<br>[$Na_{1.33}NiP_{1.33}O_5$]<br>$NaNiPO_4$ | $Na_4Ni_3P_4O_{15}$<br>[$Na_{1.33}NiP_{1.33}O_5$]<br>$Na_4Ni_3(PO_4)_2(P_2O_7)$<br>[$Na_{1.33}NiP_{1.33}O_5$]<br>$Na_{3.64}Ni_{2.18}(P_2O_7)_2$<br>[$Na_{1.67}NiP_{1.83}O_{6.42}$] |
| Cell Characteristics | Discharge Capacity (mAh/g) | 52 | 36 | 55 | 46 |
|  | Discharge Capacity Retention (%) | 68 | 73 | 74 | 75 |

|  |  | Example | |
|---|---|---|---|
|  |  | 11 | 12 |
| Composition (% by mole) | $Na_2O$ | 26.7 | 20 |
|  | NiO | 40 | 50 |
|  | $P_2O_5$ | 33.3 | 30 |
|  | $Na_2O/NiO$ | 0.67 | 0.40 |
|  | $NiO/P_2O_5$ | 1.20 | 1.67 |
| Crystal Content (% by mass) |  | 94 | 94 |
| Amorphous Content (% by mass) |  | 6 | 6 |
| Type of Precipitated Crystal<br>* Characters in [ ] indicate a general formula where the factor of Ni is normalized to 1. |  | $Na_4Ni_3(PO_4)_2P_2O_7$<br>[$Na_{1.33}NiP_{1.33}O_5$]<br>$Na_4Ni_7(PO_4)_6$<br>[$Na_{0.57}NiP_{0.86}O_{3.43}$]<br>$\gamma$-$Na_3PO_4$ | $Na_4Ni_5(PO_4)_2P_2O_7$<br>[$Na_{0.8}NiP_{0.8}O_3$] |
| Cell Characteristics | Discharge Capacity (mAh/g) | 32 | 38 |
|  | Discharge Capacity Retention (%) | 72 | 82 |

TABLE 3

| | | Example | | |
|---|---|---|---|---|
| | | 13 | 14 | 15 |
| Composition (% by mole) | $Na_2O$ | 33.3 | 28.6 | 26.7 |
| | NiO | 33.3 | 42.8 | 46.6 |
| | $P_2O_5$ | 33.3 | 28.6 | 26.7 |
| | $Na_2O/NiO$ | 1.00 | 0.67 | 0.57 |
| | $NiO/P_2O_5$ | 1.00 | 1.50 | 1.75 |
| Crystal Content (% by mass) | | 0 | 0 | 0 |
| Amorphous Content (% by mass) | | 100 | 100 | 100 |
| Type of Precipitated Crystal | | | | |
| Cell Characteristics | Discharge Capacity (mAh/g) | 35 | 48 | 63 |
| | Discharge Capacity Retention (%) | 81 | 79 | 77 |

TABLE 4

| | | Comparative Example | | |
|---|---|---|---|---|
| | | 16 | 17 | 18 |
| Composition (% by mole) | $Na_2O$ | 28.6 | 40.9 | 5 |
| | NiO | 42.8 | 9.1 | 22.8 |
| | $P_2O_5$ | 28.6 | 50 | 72.2 |
| | $Na_2O/NiO$ | 0.67 | 4.49 | 0.22 |
| | $NiO/P_2O_5$ | 1.50 | 0.18 | 0.32 |
| Crystal Content (% by mass) | | 100 | 100 | 100 |
| Amorphous Content (% by mass) | | 0 | 0 | 0 |
| Type of Precipitated Crystal * Characters in [ ] indicate a general formula where the factor of Ni is normalized to 1. | | $Na_4Ni_3(PO_4)_2(P_2O_7)$ [$Na_{1.33}NiP_{1.33}O_5$] | $NaPO_3$<br><br>$NaNi(PO_3)_3$ [$NaNiP_3O_9$] | $Ni_3(PO_4)_2$ [$NiP_{0.67}O_{2.67}$]<br>$Na_3PO_4$ |
| Cell Characteristics | Discharge Capacity (mAh/g) | 21 | 11.3 | 5.3 |
| | Discharge Capacity Retention (%) | 41 | 61 | 79 |

(1) Production of Positive Electrode Active Material (1-1) Production by Melt-Quenching Process Using various oxides, a carbonate material, and so on as raw materials, powders of the raw materials were formulated to give each composition shown in Tables 1 to 3. The raw material powders were loaded into a platinum crucible and melted at 1200 to 1500° C. for 90 minutes in an air atmosphere using an electric furnace. Next, resultant molten glass was poured between a pair of rotating rollers and formed into a shape with rapid cooling, thus obtaining a film-like glass body having a thickness of 0.1 to 2 mm. The film-like glass body was ground with a ball mill and then air-classified to obtain glass powder having an average particle size of 2 μm.

As for samples Nos. 1 to 12, 100 parts by mass of glass powder obtained in the above manner was fully mixed with 21.4 parts by mass (corresponding to 12 parts by mass in carbon terms) of polyethylene oxide nonylphenyl ether (having an HLB value of 13.3 and a weight average molecular weight of 660), which is a non-ionic surfactant, as a carbon source, and 10 parts by mass of ethanol, and the mixture was then dried at 100° C. for about an hour. Thereafter, the mixture was fired in a nitrogen atmosphere at 600° C. (700° C. as for Example 12) for an hour to simultaneously provide carbonization of the non-ionic surfactant and powder crystallization, thus obtaining positive electrode active material powder the surface of which was coated with carbon.

As for Nos. 13 to 15, 10.5 parts by mass of acetylene black (DENKA BLACK) was added as a conductive aid to 89.5 parts by mass of glass powder obtained in the above manner and these components were mixed at 300 rpm for 150 minutes (with a 15-minute pause every 15 minutes) using a planetary ball mill P6 manufactured by Fritsch GmbH, thus obtaining positive electrode active material powder containing carbon.

(1-2) Production by Solid Reaction Process

Sodium carbonate, sodium metaphosphate, nickel oxide, and orthophosphoric acid were weighed to give each composition described in Nos. 16 to 18 of Table 4, thus preparing a raw material batch. The raw material batch was mixed in ethanol using a planetary ball mill and then dried at 100° C. The dried raw material batch was calcined in an electric furnace at 900° C. for six hours and thus degassed. The calcined raw material batch was pressed into a shape at 500 kgf/cm² and then fired in an air atmosphere at 800° C. for 12 hours. The obtained sintered body was ground for 12 hours with a ball mill using a 20-mm diameter $ZrO_2$ ball and the ground product was air-classified to obtain a powdered solid reaction body having an average particle size D50 of 2 μm.

An amount of 100 parts by mass of powdered solid reaction body obtained in the above manner was fully mixed with 21.4 parts by mass (corresponding to 12 parts by mass in carbon terms) of polyethylene oxide nonylphenyl ether (having an HLB value of 13.3 and a weight average molecular weight of 660), which is a non-ionic surfactant, as a carbon source and 10 parts by mass of ethanol, followed by drying at 100° C. for about an hour. Thereafter, the mixture was fired in a nitrogen atmosphere at 600° C. for an hour to carbonize the non-ionic surfactant, thus obtaining positive electrode active material powder the surface of which was coated with carbon.

(1-3) Measurement of Contents of Crystal and Amorphous

The obtained positive electrode active material powder was subjected to powder X-ray diffraction measurement to identify its crystal structure and the contents of crystal and amorphous therein were determined by the previously described method. The results are shown in Tables 1 to 4. Furthermore, the XRD patterns of samples No. 1, 2, 4, 5, and 12 to 15 are shown in FIGS. 1 to 5. Note that in the lower sides of the figures the XRD patterns of crystalline phases to which these samples belong are also shown.

(2) Production of Positive Electrode

Acetylene black (Super C65 manufactured by Timcal) as a conductive aid and poly(vinylidene fluoride) as a binder were weighed and mixed with the positive electrode active material powder obtained in the above manner to give a ratio of positive electrode active material powder to conductive aid to binder of 90:5:5 (mass ratio) and the mixture was dispersed into N-methylpyrrolidinone (NMP), followed by fully stirring with a planetary centrifugal mixer to form a slurry, thus obtaining a positive electrode material.

Next, the obtained positive electrode material was coated on a 20-μm thick aluminum foil serving as a positive electrode current collector using a doctor blade with a gap of 125 μm, and the positive electrode material coated on the aluminum foil was vacuum-dried by a dryer at 70° C. and then pressed by passing it between a pair of rotating rollers to obtain an electrode sheet. This electrode sheet was punched out into an 11-mm diameter disc by an electrode cutting machine and dried at a temperature of 150° C. for eight hours under reduced pressure, thereby obtaining a circular positive electrode.

(3) Production of Test Cell

A test cell for a sodium-ion secondary cell was produced in the following manner. The positive electrode obtained in the above manner was placed, with its aluminum foil surface down, on a lower lid of a coin cell, and a separator formed of a 16-mm diameter polypropylene porous film dried at 70° C. for eight hours under reduced pressure, a metallic sodium layer as a counter electrode, and an upper lid of the coin cell were laid one after another on the positive electrode, thus producing a test cell. A 1M $NaPF_6$ solution/EC:DEC=1:1 (where EC is ethylene carbonate and DEC is diethyl carbonate) was used as an electrolytic solution. The assembly of the test cell was conducted in an environment with a dew-point of minus 70° C. or below.

(4) Charge and Discharge Test

The test cell was CC (constant-current) charged at 30° C. from an open circuit voltage to 5.1 V and its amount of electricity charged to the positive electrode active material per unit mass (first charge capacity) was determined. Next, the test cell was CC discharged from 5.1 V to 2 V and its amount of electricity discharged from the positive electrode active material per unit mass (first discharge capacity) was determined. The C rate was 0.1 C.

The results of the charge/discharge characteristics are shown in Tables 1 to 4. Furthermore, the first charge/discharge curves of the test cells for sodium-ion secondary cells using samples Nos. 1, 2, 4, 5, and 12 are shown in FIGS. 6 to 10, respectively. In the tables, "Discharge Capacity" refers to the first discharge capacity and "Discharge Capacity Retention" refers to the rate of the 50th cycle discharge capacity to the first discharge capacity.

As is obvious from Tables 1 to 4 and FIGS. 6 to 10, as for Examples Nos. 1 to 15, the discharge capacity and discharge capacity retention were 32 to 73 mAh/g and 65 to 82%, respectively, and, therefore, Examples of the present invention were excellent in these characteristics. On the other hand, as for Comparative Examples Nos. 16 to 18, the discharge capacity was 21 mAh/g or less, which was poor as compared to Examples of the present invention.

Sodium-ion Secondary Cell Using Solid Electrolyte

Tables 5 to 7 show Examples (Nos. 19 to 30) of the present invention.

TABLE 5

| | | | Example | | |
|---|---|---|---|---|---|
| | | | 19 | 20 | 21 |
| Positive Electrode Material (% by mass) | | Active Material Precursor | 76 | 76 | 76 |
| | Solid Electrolyte | β"-Alumina (Stabilizing Agent) | 21 ($Li_2O$) | 21 (MgO) | — |
| | | NASICON Crystal | — | — | 21 |
| | | Conductive Aid | 3 | 3 | 3 |
| | Solid Electrolyte Sheet | | $Li_2O$-stabilized β"-alumina | MgO-stabilized β"-alumina | NASICON crystal |
| Firing Conditions | Atmosphere | | | $N_2$ | |
| | Temperature/Time | | | 575° C./1 hr. | |
| | Crystal Content (% by mass) | | 96 | 94 | 89 |
| | Amorphous Content (% by mass) | | 4 | 6 | 11 |
| | Precipitated Crystal | | | $Na_2NiP_2O_7$ | |
| | * Characters in [ ] indicate a general formula where the factor of Ni is normalized to 1. | | | $Na_{3.61}Ni_{2.18}(P_2O_7)_2$ [$Na_{1.67}NiP_{1.83}O_{6.42}$] | |
| Cell Characteristics | Discharge Capacity (mAh/g) | | 59 | 60 | 53 |
| | Discharge Capacity Retention (%) | | 96 | 98 | 98 |

TABLE 6

| | | Example | | | |
|---|---|---|---|---|---|
| | | 22 | 23 | 24 | 25 |
| Composition (% by mole) | $Na_2O$ | 33.3 | 26.7 | 25.7 | 30.3 |
| | NiO | 33.3 | 40 | 38.6 | 36.4 |
| | FeO | | | | |
| | MnO | | | | |
| | CoO | | | | |
| | $P_2O_5$ | 33.3 | 33.3 | 25.7 | 33.3 |
| | $B_2O_3$ | | | 10 | |
| | $Na_2O$/NiO | 1.00 | 0.67 | 0.67 | 0.83 |
| | NiO/($P_2O_5$ + $SiO_2$ + $B_2O_3$) | 1.00 | 1.20 | 1.08 | 1.09 |

TABLE 6-continued

|  |  |  |  |  |  |
|---|---|---|---|---|---|
| Positive Electrode Material (% by mass) | Active Material Precursor | 70 | 76 | 76 | 76 |
|  | Solid Electrolyte (Li$_2$O-stabilized β''-alumina) | 25 | 21 | 21 | 21 |
|  | Conductive Aid | 5 | 3 | 3 | 3 |
| Firing Conditions | Atmosphere | N$_2$ | N$_2$ | N$_2$ | N$_2$ |
|  | Temperature/Time | 550° C./1 hr. | 600° C./0.5 hrs. | 600° C./1 hr. | 550° C./1 hr. |
| Crystal Content (% by mass) |  | 96 | 97 | 98 | 94 |
| Amorphous Content (% by mass) |  | 4 | 3 | 2 | 6 |
| Precipitated Crystal * Characters in [ ] indicate a general formula where the factor of Ni is normalized to 1. |  | Na$_2$NiP$_2$O$_7$ Na$_{3.64}$Ni$_{2.18}$(P$_2$O$_7$)$_2$ [Na$_{1.67}$NiP$_{1.83}$O$_{6.42}$] | Na$_2$NiP$_2$O$_7$ Na$_3$NiP$_3$O$_{10}$ Na$_4$Ni$_5$(PO$_4$)$_2$(P$_2$O$_7$)$_2$ [Na$_{0.8}$NiP$_{1.2}$O$_{4.4}$] | Na$_4$Ni$_3$(PO$_4$)$_2$(P$_2$O$_7$) BPO$_4$ NaBO$_2$ | Na$_{3.64}$Ni$_{2.18}$(P$_2$O$_7$)$_2$ [Na$_{1.67}$NiP$_{1.83}$O$_{6.42}$] |
| Cell Characteristics | Discharge Capacity (mAh/g) | 45 | 58 | 32 | 47 |
|  | Discharge Capacity Retention (%) | 92 | 93 | 93 | 96 |

|  |  | Example | |
|---|---|---|---|
|  |  | 26 | 27 |
| Composition (% by mole) | Na$_2$O | 19 | 30.3 |
|  | NiO | 47.5 | 27.3 |
|  | FeO |  | 9.1 |
|  | MnO |  |  |
|  | CoO |  |  |
|  | P$_2$O$_5$ | 33.5 | 33.3 |
|  | B$_2$O$_3$ |  |  |
|  | Na$_2$O/NiO | 0.40 | 1.11 |
|  | NiO/(P$_2$O$_5$ + SiO$_2$ + B$_2$O$_3$) | 1.42 | 0.82 |
| Positive Electrode Material (% by mass) | Active Material Precursor | 76 | 76 |
|  | Solid Electrolyte (Li$_2$O-stabilized β''-alumina) | 21 | 21 |
|  | Conductive Aid | 3 | 3 |
| Firing Conditions | Atmosphere | N$_2$ | N$_2$ |
|  | Temperature/Time | 650° C./1 hr. | 550° C./1 hr. |
| Crystal Content (% by mass) |  | 96 | 95 |
| Amorphous Content (% by mass) |  | 4 | 5 |
| Precipitated Crystal * Characters in [ ] indicate a general formula where the factor of Ni is normalized to 1. |  | Na$_{3.64}$Ni$_{2.18}$(P$_2$O$_7$)$_2$ [Na$_{1.67}$NiP$_{1.83}$O$_{6.42}$] α-Ni$_2$P$_2$O$_7$ [α-NiPO$_{3.5}$] | Na$_{3.64}$Ni$_{2.18}$(P$_2$O$_7$)$_2$ [Na$_{1.67}$NiP$_{1.83}$O$_{6.42}$] Na$_{3.12}$Fe$_{2.44}$(P$_2$O$_7$)$_2$ |
| Cell Characteristics | Discharge Capacity (mAh/g) | 39 | 44 |
|  | Discharge Capacity Retention (%) | 96 | 96 |

TABLE 7

|  |  | Example | | |
|---|---|---|---|---|
|  |  | 28 | 29 | 30 |
| Composition (% by mole) | Na$_2$O | 30.3 | 30.3 | 30.3 |
|  | NiO | 27.3 | 12.1 | 32.7 |
|  | FeO |  | 12.1 |  |
|  | MnO | 9.1 | 12.1 |  |
|  | CoO |  |  | 3.7 |
|  | P$_2$O$_5$ | 33.3 | 33.3 | 33.3 |
|  | B$_2$O$_3$ |  |  |  |
|  | Na$_2$O/NiO | 1.11 | 2.50 | 0.93 |
|  | NiO/(P$_2$O$_5$ + SiO$_2$ + B$_2$O$_3$) | 0.82 | 0.36 | 0.98 |
| Positive Electrode Material (% by mass) | Active Material Precursor | 76 | 76 | 76 |
|  | Solid Electrolyte (Li$_2$O-stabilized β''-alumina) | 21 | 21 | 21 |
|  | Conductive Aid | 3 | 3 | 3 |
| Firing Conditions | Atmosphere | N$_2$ | N$_2$ | N$_2$ |
|  | Temperature/Time | 550° C./1 hr. | 525° C./1 hr. | 525° C./1 hr. |
| Crystal Content (% by mass) |  | 91 | 87 | 89 |
| Amorphous Content (% by mass) |  | 9 | 13 | 11 |
| Precipitated Crystal * Characters in [ ] indicate a general where the factor of Ni is normalized to 1. |  | Na$_{3.64}$Ni$_{2.18}$(P$_2$O$_7$)$_2$ [Na$_{1.67}$NiP$_{1.83}$O$_{0.42}$] | Na$_{3.64}$Ni$_{2.18}$(P$_2$O$_7$)$_2$ [Na$_{1.67}$NiP$_{1.83}$O$_{0.42}$] Na$_{3.12}$Fe$_{2.44}$(P$_2$O$_7$)$_2$ Na$_2$MnP$_2$O$_7$ | Na$_{3.64}$Ni$_{2.18}$(P$_2$O$_7$)$_2$ [Na$_{1.67}$NiP$_{1.83}$O$_{0.42}$] |

TABLE 7-continued

| | | Example | | |
|---|---|---|---|---|
| | | 28 | 29 | 30 |
| Cell Characteristics | Discharge Capacity (mAh/g) | 53 | 55 | 53 |
| | Discharge Capacity Retention (%) | 94 | 89 | 98 |

(1) Preparation of Positive Electrode Active Material Precursor Powder

Sodium metaphosphate ($NaPO_3$), nickel oxide (NiO), sodium carbonate ($Na_2CO_3$), orthophosphoric acid ($H_3PO_4$), and manganese dioxide ($MnO_2$), ferric oxide ($Fe_2O$), cobalt oxide (CoO) or boric acid ($B_2O_3$) were used as raw materials, powders of these raw materials were formulated to give a composition of, in % by mole, 33.3% $Na_2O$, 33.3% NiO, and 33.3% $P_2O_5$ in the cases of Nos. 19 to 21 or each composition described in Tables 6 and 7 in the cases of Nos. 22 to 30, and the mixture was melted in an air atmosphere at 1250° C. for 45 minutes. Thereafter, resultant molten glass was poured between a pair of rotating rollers and formed into a shape with rapid cooling, thus obtaining a film-like glass body having a thickness of 0.1 to 1 mm. This film-like glass body was ground for 10 hours with a ball mill using a 20-mm diameter $ZrO_2$ ball and the ground product was passed through a resin-made sieve with 120-µm openings to obtain coarse glass powder having an average particle size of 7 µm. Furthermore, the coarse glass powder was ground, using ethanol as a grinding aid, for 80 hours with a ball mill using a 3-mm diameter $ZrO_2$ ball, thus obtaining glass powder (positive electrode active material precursor powder) having an average particle size of 0.6 µm. As a result of XRD measurement, the glass powder was confirmed to be amorphous.

(2) Preparation of Sodium-Ion Conductive Solid Electrolyte ($Li_2O$-Stabilized β" Alumina)

A $Li_2O$-stabilized β" alumina having a composition formula of $Na_{1.6}Li_{0.34}Al_{10.66}O_{17}$ (manufactured by Ionotec Ltd.) was processed by dry grinding to a thickness of 0.2 mm, thus obtaining a solid electrolyte sheet. Furthermore, solid electrolyte powder (having an average particle size of 2 µm) was separately prepared (for use in No. 19) by grinding the obtained solid electrolyte sheet with a planetary ball mill and passing the ground product through a sieve with 10-µm openings. Alternatively, solid electrolyte powder (having an average particle size of 1.5 µm) was separately prepared (for use in Nos. 22 to 30) by grinding the obtained solid electrolyte sheet with a planetary ball mill and air-classifying the ground product.

(MgO-Stabilized β" Alumina)

Sodium carbonate ($Na_2CO_3$), aluminum oxide ($Al_2O_3$), and magnesium oxide (MgO) were used as raw materials, powders of these raw materials were formulated to give a composition of, in % by mole, 13.0% $Na_2O$, 80.2% $Al_2O_3$, and 6.8% MgO, and the mixture was ground and mixed in ethanol for 10 hours with a ball mill using a 5-mm diameter $Al_2O_3$ ball. The obtained mixed powder was formed into a 0.2-mm thick sheet, then isostatically pressed at a pressure of 40 MPa, and heat-treated in an air atmosphere at 1640° C. for an hour to obtain a solid electrolyte sheet made of MgO-stabilized β" alumina.

Furthermore, solid electrolyte powder (having an average particle size of 2.5 µm) was separately prepared by grinding the obtained solid electrolyte sheet with a planetary ball mill and passing the ground product through a sieve with 10-µm openings. When the powder X-ray diffraction pattern of the obtained solid electrolyte powder was checked, diffraction lines originating from (($Al_{10.32}Mg_{0.68}O_{16}$)($Na_{1.68}O$)) which is a trigonal crystal belonging to space group R-3m were confirmed.

(NASICON Crystal)

Sodium metaphosphate ($NaPO_3$), yttria-stabilized zirconia (($ZrO_2$)$_{0.97}$($Y_2O_3$)$_{0.03}$), sodium carbonate ($Na_2CO_3$), and silicon oxide ($SiO_2$) were used as raw materials, powders of these raw materials were formulated to give a composition of, in % by mole, 25.3% $Na_2O$, 31.6% $ZrO_2$, 1.0% $Y_2O_3$, 8.4% $P_2O_5$, and 33.7% $SiO_2$, and the mixture was ground and mixed in ethanol for 10 hours with a ball mill using a 5-mm diameter $Al_2O_3$ ball. The obtained powder was formed into a 0.2-mm thick sheet, then isostatically pressed at a pressure of 40 MPa, and heat-treated in an air atmosphere at 1250° C. for two hours to obtain a solid electrolyte sheet made of NASICON crystal.

Furthermore, solid electrolyte powder (having an average particle size of 2.3 µm) was separately prepared by grinding the obtained solid electrolyte sheet with a planetary ball mill and passing the ground product through a sieve with 10-µm openings. When the powder X-ray diffraction pattern of the solid electrolyte crystal was checked, diffraction lines originating from ($Na_{3.05}Zr_2Si_{2.05}P_{0.95}O_{12}$) which is a trigonal crystal belonging to space group R-3c were confirmed.

(3) Production of Solid-State Sodium-Ion Secondary Cell

The positive electrode active material precursor powder and solid electrolyte powder obtained in the above manners, and acetylene black (Super C65 manufactured by Timcal) as a conductive aid were weighed in each ratio described in Tables 5 to 7 and mixed at 300 rpm for 30 minutes using a planetary ball mill. Added to 100 parts by mass of the obtained mixed powder were 10 parts by mass of polypropylene carbonate (manufactured by Sumitomo Seika Chemicals Co., Ltd.) and additionally 30 parts by mass of N-methylpyrrolidinone. The mixture was fully stirred with a planetary centrifugal mixer to form a slurry.

The obtained slurry was applied, with an area of 1 $cm^2$ and a thickness of 70 µm, to one side of the solid electrolyte sheet described in Tables 5 to 7 and then dried at 70° C. for three hours. Next, the product was put into a carbon container and fired in firing conditions described in Tables 5 to 7 to crystallize the positive electrode active material precursor powder, thus forming a positive electrode layer. All the above operations were conducted in an environment with the dew point of minus 50° C. or below.

When the powder X-ray diffraction patterns of the materials making up the positive electrode layer were checked, diffraction lines originating from the crystals described in Tables 5 to 7 were confirmed. Regarding all the positive electrodes, respective crystalline diffraction lines originating from the solid electrolyte powders used were confirmed.

Next, a current collector formed of a 300-nm thick gold electrode was formed on the surface of the positive electrode layer using a sputtering device (SC-701AT manufactured by Sanyu Electron Co., Ltd.). Furthermore, in an argon atmosphere with the dew point of minus 70° C. or below, metallic sodium serving as a counter electrode was pressure-bonded to the surface of the solid electrolyte layer opposite to the surface thereof on which the positive electrode layer was formed. The obtained laminate was placed on a lower lid of a coin cell and covered with an upper lid to produce a CR2032-type test cell.

(4) Charge/Discharge Test

The produced test cell was CC (constant-current) charged at 60° C. from an open circuit voltage to 5.2 V and its amount of electricity charged to the positive electrode active material per unit mass (first charge capacity) was determined. Next, the test cell was CC discharged from 5.2 V to 2 V and its amount of electricity discharged from the positive electrode active material per unit mass (first discharge capacity) was determined. In this test, the C rate was 0.01 C and "Discharge Capacity Retention" was evaluated as a rate of the 10th cycle discharge capacity to the first discharge capacity. The results are shown in Tables 5 to 7 and FIGS. 11 to 15.

As is obvious from Tables 5 to 7 and FIGS. 11 to 15, as for Nos. 19 to 30, the discharge capacity and the discharge capacity retention were 32 to 60 mAh/g and 89 to 98%, respectively, and these characteristics were excellent.

INDUSTRIAL APPLICABILITY

The positive electrode active material for a sodium-ion secondary cell according to the present invention is suitable for sodium-ion secondary cells used in portable electronic devices, electric vehicles, electric power tools, backup emergency power supplies, and so on.

The invention claimed is:

1. A positive electrode active material for a sodium-ion secondary cell, the positive electrode active material containing, in terms of % by mole of oxide, 8 to 55% $Na_2O$, 10 to 70% NiO, 0 to 60% of at least one selected from the group consisting of CrO, FeO, MnO, and CoO, and 15 to 70% of at least one selected from the group consisting of $P_2O_5$, $SiO_2$, and $B_2O_3$, the positive electrode active material containing an amorphous phase and a crystal, wherein
the crystal is represented by a general formula $Na_x(Ni_{1-a}M_a)A_yO_z$ (where M represents at least one selected from the group consisting of Fe, Cr, Mn, and Co, A represents at least one selected from the group consisting of P, Si, and B, $0.2 \leq x \leq 1.67$, $0.65 \leq y \leq 1.83$, $2.5 \leq z \leq 20$, and $0 \leq a \leq 0.9$).

2. The positive electrode active material according to claim 1, wherein the crystal has at least one crystal structure selected from the group consisting of monoclinic, triclinic, and orthorhombic crystal structures.

3. A positive electrode for a sodium-ion secondary cell containing the positive electrode active material according to claim 1.

4. The positive electrode according to claim 3, the positive electrode further containing a conductive aid.

5. The positive electrode according to claim 3, the positive electrode further containing a sodium-ion conductive solid electrolyte.

6. The positive electrode according to claim 5, wherein the sodium-ion conductive solid electrolyte is beta-alumina or a NASICON crystal.

7. The positive electrode according to claim 3, the positive electrode containing, in % by mass, 30 to 100% of the positive electrode active material, 0 to 20% of a conductive aid, and 0 to 70 of a sodium-ion conductive solid electrolyte.

8. A sodium-ion secondary cell comprising the positive electrode according to claim 3.

9. A positive electrode active material for a sodium-ion secondary cell, the positive electrode active material containing, in terms of % by mole of oxide, 8 to 30.3% $Na_2O$, 10 to 70% NiO, 0 to 60% of at least one selected from the group consisting of CrO, FeO, MnO, and CoO, and 15 to 70% of at least one selected from the group consisting of $P_2O_5$, $SiO_2$, and $B_2O_3$, the positive electrode active material consisting of an amorphous phase.

10. A method for producing the positive electrode active material according to claim 1, the method comprising the steps of:
melting a raw material batch containing, in terms of % by mole of oxide, 8 to 55% $Na_2O$, 10 to 70% NiO, 0 to 60% of at least one selected from the group consisting of CrO, FeO, MnO, and CoO, and 15 to 70% of at least one selected from the group consisting of $P_2O_5$, $SiO_2$, and $B_2O_3$, to obtain a melt;
cooling the melt to obtain a glass body; and
firing the glass body to be crystallized.

* * * * *